United States Patent
Katsube et al.

(10) Patent No.: US 6,188,689 B1
(45) Date of Patent: Feb. 13, 2001

(54) NETWORK NODE AND METHOD OF FRAME TRANSFER

(75) Inventors: Yasuhiro Katsube, Kanagawa-ken; Katsumi Yamato, Saitama-ken; Shigeo Matsuzawa, Tokyo, all of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 08/941,735

(22) Filed: Oct. 1, 1997

(30) Foreign Application Priority Data

Oct. 4, 1996 (JP) ............... 8-264011

(51) Int. Cl.[7] ............... H04L 12/28; H04L 12/56
(52) U.S. Cl. ............... 370/389; 370/252
(58) Field of Search ............... 370/389, 230, 370/231, 235, 252, 253, 299, 326, 327, 351, 359, 360, 382, 390, 392, 394, 395, 396, 397, 399, 400, 401, 402, 404, 405, 406, 420, 466, 467, 469, 474

(56) References Cited

U.S. PATENT DOCUMENTS

| | | |
|---|---|---|
| 5,363,369 | 11/1994 | Hemmady et al. . |
| 5,633,869 * | 5/1997 | Burnett et al. ............... 370/396 |
| 5,802,047 * | 9/1998 | Kinoshita ............... 370/359 |
| 5,835,710 * | 11/1998 | Nagami et al. ............... 709/250 |
| 5,859,848 * | 1/1999 | Miura et al. ............... 370/395 |
| 5,872,783 * | 2/1999 | Chin ............... 370/392 |
| 5,898,669 * | 4/1999 | Shimony et al. ............... 370/232 |
| 5,917,820 * | 6/1999 | Rekhter ............... 370/392 |
| 5,930,259 * | 7/1999 | Katsube et al. ............... 370/409 |
| 6,016,319 * | 1/2000 | Kshirsagar et al. ............... 370/410 |

FOREIGN PATENT DOCUMENTS

| | | |
|---|---|---|
| 0597487A2 | 5/1994 | (EP) . |
| 0597487A3 | 12/1996 | (EP) . |

OTHER PUBLICATIONS

Rekhter et al., Network Working Group, Internet Draft, "Tag Switching Architecture Overview", Internet Engineering Task Force (IETF), pp. 1–14, Sep. 1996.

Hong Linh Truong et al., "LAN Emulation on an ATM Network" IEEE Communications Magazine, May 1995.

* cited by examiner

*Primary Examiner*—Dang Ton
*Assistant Examiner*—Phirin Sam
(74) *Attorney, Agent, or Firm*—Finnegan, Henderson, Farabow, Garrett & Dunner, L.L.P.

(57) ABSTRACT

The system defines a dedicated virtual link (DVL) for a specified packet flow. The router receives a datalink frame having a Media Access Control (MAC) address field. An identifier of the DVL allocated between the router and a previous-hop node is written in the frame using the MAC address field. The router refers to a correspondence relationship between the identifier of the DVL and information for designating a next-hop node, based on the identifier of the DVL included in the received frame, and transfers the frame to the next-hop node without network-layer processing.

26 Claims, 21 Drawing Sheets

| FLOW ID | OUTPUT I/F | NEXT-HOP IP ADDRESS | DVL POINTER |
|---|---|---|---|
| IP#312 | 1 | aaa.bbb.321.341 | 100 |
| IP#314 | 1 | aaa.bbb.321.341 | 101 |

FIG. 8

| DVL POINTER | OUTPUT I/F | DATALINK TYPE | OUTPUT DATALINK HEADER |
|---|---|---|---|
| 100 | 1 | ETHERNET | {(1,DVLIx1),(0,MAC#341)} or {(0,MAC#311),(1DVLIx1)} |
| 101 | 1 | ETHERNET | {(1,DVLIx2),(0,MAC#341)} or {(0,MAC#311),(1DVLIx2)} |

FIG. 9

| INPUT I/F | INPUT DVLI | OUTPUT I/F | DATALINK TYPE | OUTPUT DATALINK HEADER | PRIORITY |
|---|---|---|---|---|---|
| 1 | x1 | 2 | ETHERNET | {(1,DVLI y1),(0,MAC#342)} or {(0,MAC#341),(1,DVLI y1)} | A |
| 1 | x2 | 2 | ETHERNET | {(0,MAC#341),(0,MAC#342)} | B |

FIG. 11

| FLOW ID | OUTPUT I/F | NEXT-HOP IP ADDRESS | DVL POINTER |
|---|---|---|---|
| (IP#311,IP#312) | 2 | aaa.bbb.322.342 | 200 |
| (IP#313,IP#314) | 2 | aaa.bbb.322.342 | 201 |
| (IP#311,IP#314) | 2 | aaa.bbb.322.342 | — |

FIG. 12

| DVL POINTER | OUTPUT I/F | DATALINK TYPE | OUTPUT DATALINK HEADER |
|---|---|---|---|
| 200 | 2 | ETHERNET | {(1,DVLI y1),(0,MAC#342)} or {(0,MAC#341),(1,DVLI y1)} |
| 201 | 2 | ETHERNET | {(1,DVLI y3),(0,MAC#342)} or {(0,MAC#341),(1,DVLI y3)} |

FIG. 13

| INPUT I/F | INPUT DVLI | OUTPUT I/F | DATALINK TYPE | OUTPUT DATALINK HEADER | PRIORITY |
|---|---|---|---|---|---|
| 1 | y1 | 3 | ATM | {VPI/VCI=100/200} | A |
| 1 | y3 | 3 | ATM | {VPI/VCI=100/100} | A |
| 1 | y4 | 2 | ETHERNET | {(SOURCE MAC I U/L=0, MAC#342),(DESTINATION MAC I U/L=1,DVLI z3)} | B |

FIG. 15

| FLOW I/D | OUTPUT I/F | NEXT-HOP IP ADDRESS | DVL POINTER |
|---|---|---|---|
| (IP#311,IP#312) | 3 | aaa.bbb.33.343 | 500 |
| (IP#313,IP#314) | 3 | aaa.bbb.33.343 | — |
| (IP#311,IP#314) | 3 | aaa.bbb.33.343 | 502 |

FIG. 16

| DVL POINTER | OUTPUT I/F | DATALINK TYPE | OUTPUT DATALINK HEADER |
|---|---|---|---|
| 500 | 3 | ATM | {VPI/VCI=100/200} |
| 502 | 3 | ATM | {VPI/VCI=100/202} |

FIG. 17

| INPUT I/F | INPUT VPI/VCI | OUTPUT I/F | DATALINK TYPE | OUTPUT DATALINK HEADER | PRIORITY |
|---|---|---|---|---|---|
| 3 | 300/400 | 1 | ETHERNET | {(SOURCE MAC I U/L=0, MAC#343), (DESTINATION MAC I U/L=1,DVLI w1)} | A |
| 3 | 300/401 | 1 | ETHERNET | {(SOURCE MAC I U/L=0, MAC#343), (DESTINATION MAC I U/L=0,MAC#314)} | B |

FIG. 19

| FLOW I/D | OUTPUT I/F | NEXT-HOP IP ADDRESS | DVL POINTER |
|---|---|---|---|
| (IP#311,IP#312) | 1 | direct | 600 |
| (IP#313,IP#314) | 2 | direct | |

FIG. 20

| DVL POINTER | OUTPUT I/F | DATALINK TYPE | OUTPUT DATALINK HEADER |
|---|---|---|---|
| 600 | 1 | ETHERNET | {(SOURCE MAC I U/L=0,MAC#343), (DESTINATION MAC I U/L=1,DVLI w1)} |

FIG. 21

| INPUT I/F | INPUT VPI/VCI | OUTPUT I/F | OUTPUT VPI/VCI |
|---|---|---|---|
| | | | |
| | | | |
| | | | |

FIG. 25

| INPUT VPI/VCI | OUTPUT ETHERNET HEADER |
|---|---|
| | |
| | |
| | |

FIG. 26

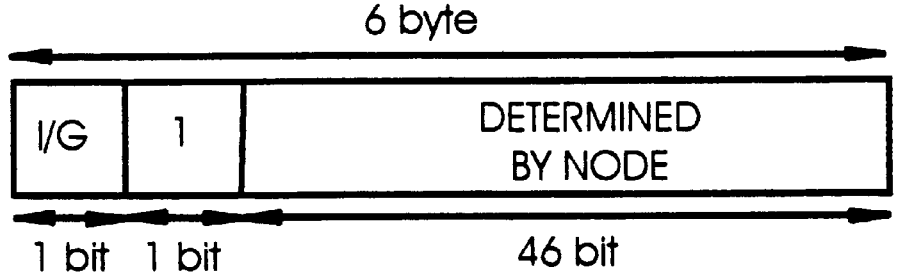
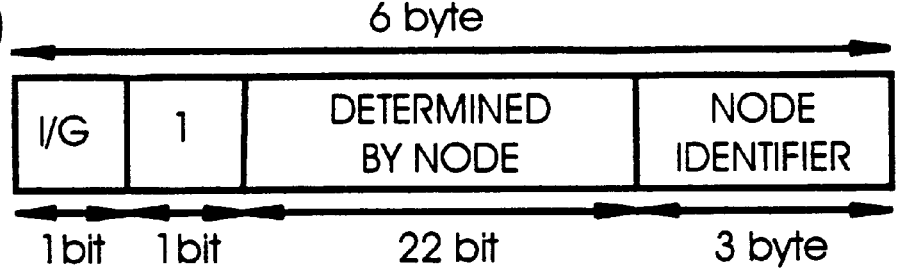
FIG. 29

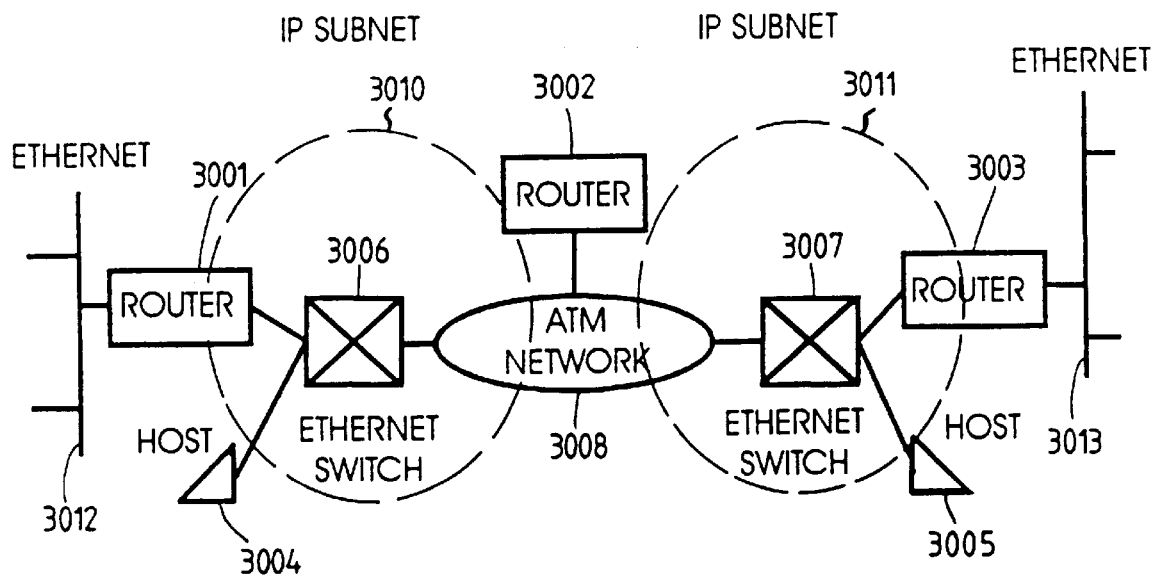
FIG. 30(a)
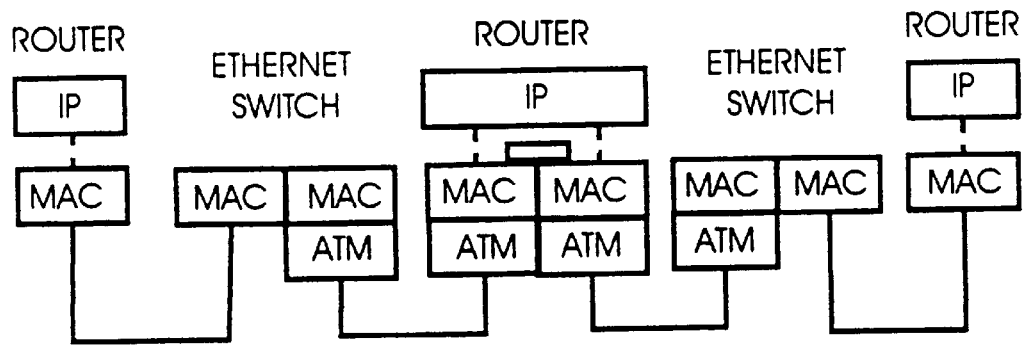
FIG. 30(b)
| DESTINATION MAC ADDRESS | VPI/VCI | 3101 |
|---|---|---|
| MAC#3002 | 100/300 | |
| {xxxxDVLI1} | 100/300 | |
| {xxxxDVLI2} | 100/300 | |
FIG. 31

NETWORK NODE AND METHOD OF FRAME TRANSFER

BACKGROUND OF THE INVENTION

The present invention relates to a node (router) that is capable of connecting communication networks such as for example Ethernets and that is capable of transferring packets at the frame level defined in the datalink layer, and to a method of frame transfer.

A router device is used for connecting LANs (Local Area Networks) and transfers datagrams from one LAN to another LAN. In addition to the communication information data to be transferred, the datagram includes the network-layer addresses of its source and destination (i.e. source IP address and destination IP address in a case of IP (Internet Protocol)). The router determines a next-hop node (router or host) and an output interface of the datagram based on the destination address.

In a conventional router, when datalink frames (for example, Ethernet frames) defined in the datalink layer (for example, MAC (Media Access Control) layer) are received from one LAN, these frames are first subjected to the datalink-layer processing, then converted into a packet for being subjected to the network-layer processing.

The output interface and the network-layer address of the next-hop node of this packet are then determined from the network-layer destination address contained in this packet, so that this packet can then be handed over to the corresponding output interface. At this output interface, the datalink-layer address is determined from the network-layer address of the next-hop node and then the packet is converted into datalink frames to be output to another LAN.

The router that transfers communication information (datalink frames) by the procedure described above, after converting received datalink frames into a network-layer packet, determines a node to which this packet is next to be sent (next-hop router or destination host) and an output interface corresponding to the next-hop node, by referring to the content of this packet such as the network-layer address of the final destination (and source address) and by using a network-layer routing table held in the router, and then converts the packet into datalink frames once more to output the frames to the next-hop node.

In the conventional router, the excessive amount of processing within the router involved in the conversion of received datalink frames into a packet, lookup of the network-layer routing table, and conversion of the packet into datalink frames resulted in a large processing time being required for the frame transfer and in a large processing load required within the router.

SUMMARY OF THE INVENTION

It is therefore an object of the present invention to provide a mechanism for determining the next transfer target of a received datalink frame, without frame-packet conversion and without network-layer processing, to transfer the datalink frame along the path prescribed for the packet by a network-layer routing protocol.

Datalink frames may be connectionless-type frames such as MAC frames or connection-oriented frames such as cells in ATM (Asynchronous Transfer Mode) or frames in frame relay. The present invention will be applied to a case of receiving a connectionless-type frame and transferring it as (transmitting) a connectionless-type frame, or a case of receiving a connectionless-type frame and transferring it as (transmitting) a connection-oriented frame, or a case of receiving a connection-oriented frame and transferring it as (transmitting) a connectionless-type frame.

According to one aspect of the present invention, there is provided a node, comprising: first means for transferring a connection-less type frame received from one logical network to another logical network by assembling a packet from the received frame and by referring to a destination network-layer address in the packet; a memory for storing a correspondence relationship between an input dedicated virtual link identifier allocated dedicatedly to a specified flow and information for designating a next-hop node to which a frame of the specified flow is to be transferred; and second means for transferring a connection-less type frame received from one logical network to another logical network by referring to the correspondence relationship stored in the memory based on the input dedicated virtual link identifier written in the received frame using a Media Access Control (MAC) address field and by writing the information for designating the next-hop node in the frame to be transferred.

According to another aspect of the present invention, there is provided a node, comprising: first means for transferring a frame received from a connection-less logical network to a connection-oriented logical network by assembling a packet from the received frame and by referring to a destination network-layer address in the packet; a memory for storing a correspondence relationship between an input dedicated virtual link identifier allocated dedicatedly to a specified flow and a virtual connection connected with a next-hop node to which a frame of the specified flow is to be transferred; and second means for transferring a frame received from the connectionless logical network to the connection-oriented logical network using the virtual connection by referring to the correspondence relationship stored in the memory based on the input dedicated virtual link identifier written in the received frame.

According to yet another aspect of the present invention, there is provided a node, comprising: first means for transferring a frame received from a connection-oriented logical network to a connection-less logical network by assembling a packet from the received frame and by referring to a destination network-layer address in the packet; a memory for storing a correspondence relationship between a virtual connection to be used for receiving a frame of a specified flow and an output dedicated virtual link identifier allocated dedicatedly to the specified flow and/or a MAC address of a next-hop node to which a frame of the specified flow is to be transferred; and second means for transferring a frame received from the connection-oriented logical network to the connection-less logical network by referring to the correspondence relationship stored in the memory based on the virtual connection used for receiving the frame and by writing the output dedicated virtual link identifier and/or the MAC address of the next-hop node in the frame to be transferred.

According to yet another aspect of the present invention, there is provided a node belonging to one logical network for transmitting a frame to a destination node belonging to another logical network, comprising: first means for transmitting a connection-less type frame of a packet by writing a MAC address of a next-hop node determined based on a network-layer address of the destination node in the packet in a MAC address field of the frame; a memory for storing a dedicated virtual link identifier allocated between the node and the next-hop node dedicatedly to a specified flow; and second means for transmitting a connection-less type frame of the specified flow by writing the dedicated virtual link identifier stored in the memory in the frame using the MAC address field.

According to yet another aspect of the present invention, there is provided a method of frame transfer, comprising the steps of: storing a correspondence relationship between an input dedicated virtual link identifier allocated in one logical network dedicatedly to a specified flow and information for designating a next-hop node in another logical network to which a frame of the specified flow is to be transferred; transferring a frame received from one logical network to another logical network by referring to the correspondence relationship stored in the memory based on the input dedicated virtual link identifier written in the received frame using a MAC address field and by writing the information for designating the next-hop node in the frame to be transferred; and transferring another frame received from one logical network to another logical network by assembling a packet from said another received frame and by referring to a destination network-layer address in the packet, when said another received frame does not contain the input dedicated virtual link identifier whose correspondence relationship is stored in the memory.

According to yet another aspect of the present invention, there is provided a method of frame transmission, comprising the steps of: storing a dedicated virtual link identifier allocated dedicatedly to a specified flow between the node and a next-hop node to which a frame of the specified flow is to be transmitted; transmitting a connection-less type frame of the specified flow by writing the dedicated virtual link identifier stored in the memory in the frame using a MAC address field; and transmitting a connection-less type frame of a packet other than the specified flow by writing a MAC address of a next-hop node determined based on a destination network-layer address in the packet in the MAC address field of the frame.

Other features and advantage of the present invention will be become apparent from the following description taken in conjunction with the accompanying drawings.

Both the foregoing general description and the following detailed description provide examples consistent with this invention and explain how to make and use systems and methods consistent with the invention. These description do not restrict the claimed invention.

BRIEF DESCRIPTION OF THE DRAWINGS

FIG. 8 shows exemplary contents of the IP routing table of the sending host.

FIG. 9 shows exemplary contents of the dedicated virtual link (DVL) information table of the sending host.

FIG. 11 shows exemplary contents of the cut-through information table of the router that connects one Ethernet with another Ethernet.

FIG. 12 shows exemplary contents of the IP routing table of the router that connects one Ethernet with another Ethernet.

FIG. 13 shows exemplary contents of the DVL information table of the router that connects one Ethernet with another Ethernet.

FIG. 15 shows exemplary contents of the cut-through information table of the router that connects an Ethernet with an ATM network.

FIG. 16 shows exemplary contents of the IP routing table of the router that connects an Ethernet with an ATM network.

FIG. 17 shows exemplary contents of the DVL information table of the router that connects an Ethernet with an ATM network.

FIG. 19 shows exemplary contents of the cut-through information table of the router that connects an ATM network with an Ethernet.

FIG. 20 shows exemplary contents of the IP routing table of the router that connects an ATM network with an Ethernet.

FIG. 21 shows exemplary contents of the DVL information table of the router that connects an ATM network with an Ethernet.

FIG. 25 shows an example of the ATM routing table in the third and fourth exemplary configurations of the router.

FIG. 26 shows an example of the Ethernet header table in the fourth exemplary configuration of the router.

FIGS. 29(a) and (b) show examples of the DVLI allocation.

FIG. 30(a) shows another exemplary network topology and

FIG. 30(b) illustrates a procedure of IP packet transfer according to the present invention in a case of LAN emulation.

FIG. 31 shows exemplary contents of MAC address v. VC table in the Ethernet switch.

DETAILED DESCRIPTION OF THE PREFERRED EMBODIMENTS

Figure 1:
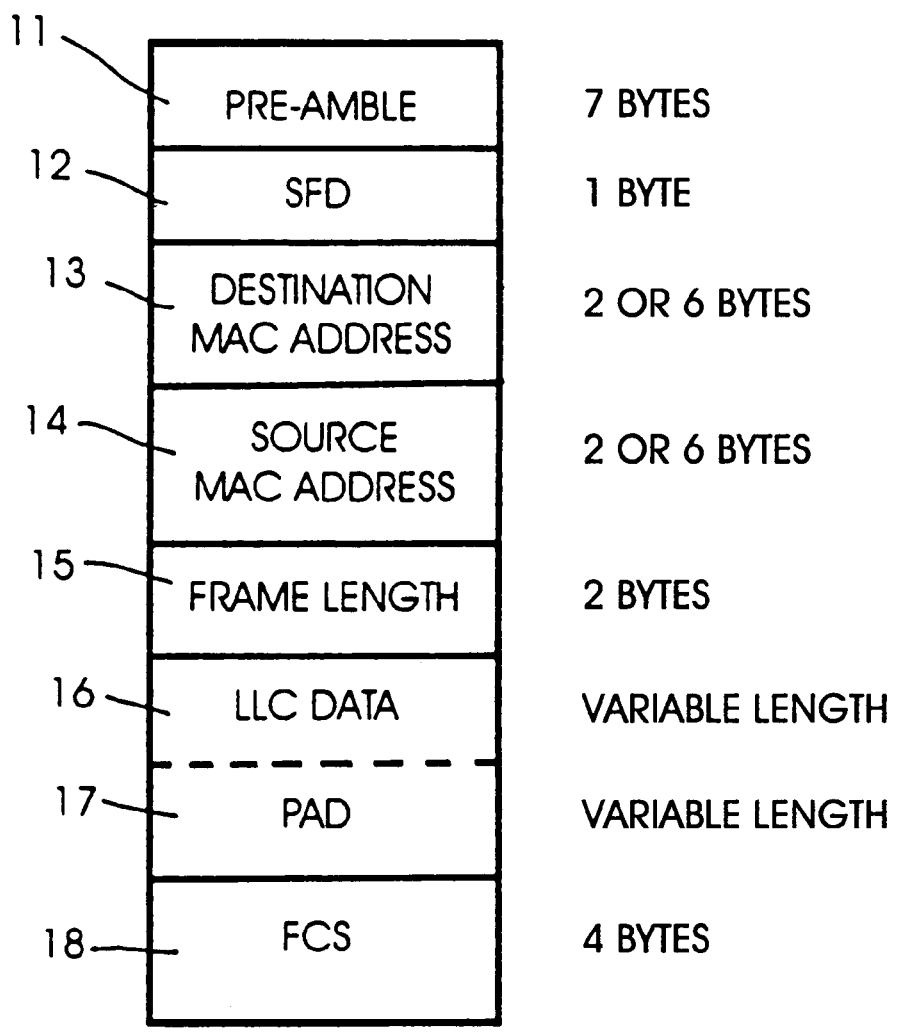
FIG. 1 shows a format of an Ethernet frame (MAC frame).

FIG. 1 shows an Ethernet frame format (MAC frame format) according to IEEE 802.3 specification. Communication information is transmitted and received on an Ethernet using frames in accordance with this format.

As shown in FIG. 1, an Ethernet frame comprises: preamble (11) which is a signal for synchronizing the receiving function of nodes; SFD (Start Frame Delimiter) (12) which is a symbol for identifying the start of a frame; destination MAC address (13) indicating the node that is to receive the frame; source MAC address (14) indicating the node that sent the frame; frame length (15) which indicates the length of the LLC (Logical Link Control) data; LLC data (16) for containing data in accordance with the LLC format; PAD (17) that fills up a empty portion to make the frame the minimum frame size (64 bytes); and FCS (Frame Check Sequence) (18) where 32-bit CRC (Cyclic Redundancy Check), calculated based on portions other than the preamble, SFD and FCS, is entered.

Figure 2:
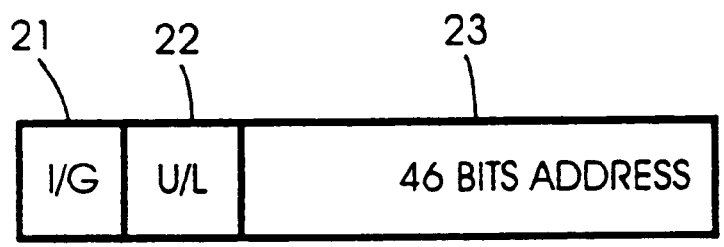
FIG. 2 shows a format of the source MAC address and destination MAC address of the Ethernet frame (MAC frame).

FIG. 2 shows a format of the destination MAC address (13) and source MAC address (14) in the Ethernet frame. The MAC address may be defined as 2 bytes or 6 bytes, but it will hereinafter be assumed that both the destination and source MAC addresses are expressed by a 6-byte representation since practically the 6-byte representation is used.

As shown in FIG. 2, the MAC address comprises: an I/G bit (21) indicating whether the MAC address is an individual address or a multicast address; a U/L bit (22) indicating whether the MAC address is a universal address or a local address; and an address field (23), into which the actual address is entered.

When the I/G bit (21) has the value 0, it indicates that the address is an individual address; when it has the value 1, it indicates that the address is a multicast address (or broadcast address).

When the U/L bit (22) has the value 0, it indicates that the address is a universal address; when it has the value 1, it indicates that the address is a local address. A universal address is an address which is unique in the whole world and is given to each Ethernet interface board; a local address is an address that is valid only within a local environment.

A transfer method at each router in communication networks when an IP packet is transferred from a sending host to a receiving host will now be described, taking the communication network topology shown in FIG. 3(a) as an example.

Figure 3A:
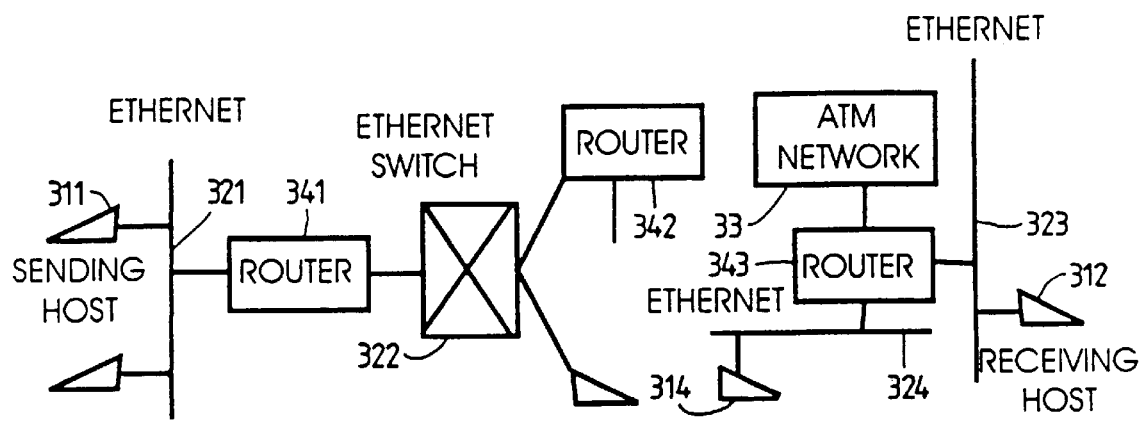
FIG. 3(a) shows an exemplary network topology.

As shown in FIG. 3(a), an IP packet destined for receiving host 312 and generated by sending host 311 passes through the route: Ethernet 321, router 341, Ethernet switch 322, router 342, ATM network 33, router 343, and Ethernet 323, and then finally is received by receiving host 312.

First of all, the conventional packet transfer method will be described. Sending host 311, using information such as destination IP address of the packet, determines a next-hop node (router or destination host) to which the packet is to be sent next. Sending host 311, after performing, if necessary, datalink-layer processing such as resolving a MAC address of the next-hop node (router 341), converts the packet to Ethernet frames, and sends them onto Ethernet 321.

When router 341 receives the frames, whose destination MAC address is the address of router 341, from Ethernet 321, it assembles an IP packet from the frames and, referring to the IP routing table on the basis of the information such as destination IP address (host 312) contained in the packet, determines a next-hop node (router 342) to which the packet is to be sent next. Then, after datalink-layer processing such as resolving a MAC address of router 342 if necessary, the packet is converted to Ethernet frames, which is sent to Ethernet switch 322 connected to router 342.

Ethernet switch 322 sends each received frame to router 342 in accordance with the destination MAC address of the frame.

Router 342, like router 341, assembles the received frames into an IP packet, and determines a next-hop node (router 343) to which the packet is to be sent next, based on the destination IP address (host 312) etc. If an output interface to router 343 is an ATM network, two methods shown in FIG. 3(b) and FIG. 3(c) can be adopted.

Figure 3B:
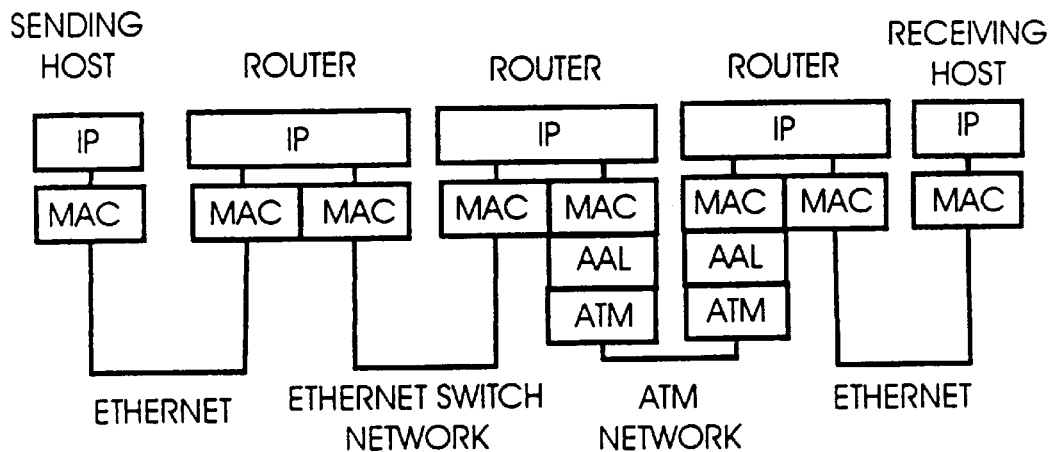
FIGS. 3(b) and (c) illustrate procedures of IP packet transfer according to the conventional routers.

One method is that, as shown in FIG. 3(b), the router creates an Ethernet frame with the MAC address of the next-hop node when transmitting a packet to an ATM network, similar to the transmission of a packet to an Ethernet or Ethernet switch network. Then, the router converts the Ethernet frame to cells, and sends the cells to the ATM connection that is established from router 342 to router 343. If no ATM connection exists from router 342 to router 343, an ATM address corresponding to the MAC address of router 343 is acquired and the cells of the frame are transferred after setting up an ATM connection to this ATM address.

Figure 3C:
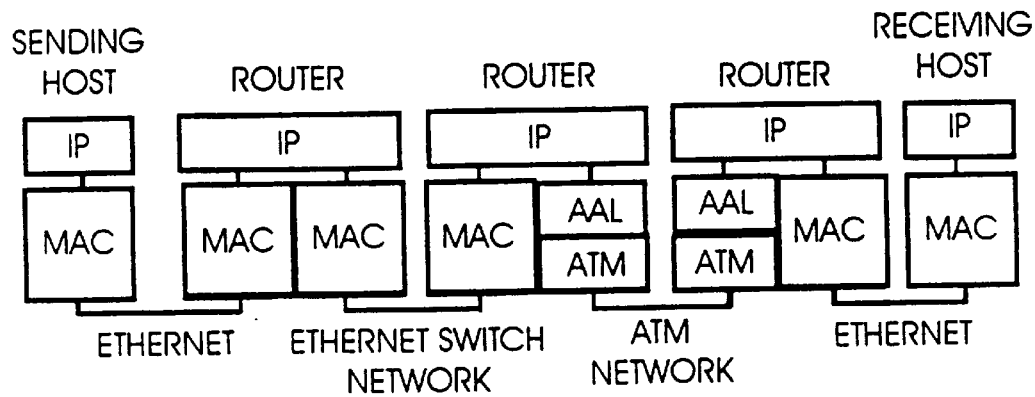

Another method is that, as shown in FIG. 3(c) and as described in RFC (Request for Comments) 1483 of IETF (Internet Engineering Task Force), the router attaches prescribed link control information to an IP packet and converts the IP packet into cells, without constructing an Ethernet frame and without attaching an MAC address. Then, the router sends the cells to the ATM connection provided from router 342 to router 343. If no ATM connection exists from router 342 to router 343, an ATM address corresponding to the IP address of router 343 is acquired and the cells of the packet is transferred after setting up an ATM connection to this ATM address.

Router 343 reconstructs the IP packet from the received cells, and determines a next-hop node (in this case, destination host 312 itself) to which the packet is to be sent next, by using the destination IP address (host 312) etc. of the IP packet. Then, after performing datalink-layer processing such as resolving a MAC address of host 312 if necessary, the packet is converted to Ethernet frames and sent onto Ethernet 323.

In this way, the Ethernet frames of the packet are received by host 312, which is the final destination, and thereby the contents of the packet are handed over to the IP layer and upper layers.

In contrast, the embodiments according to the present invention provide a function for transferring packets in the form of datalink frames (MAC frames or ATM cells) as they are (without going through IP level (network-layer level) processing) even beyond a boundary of logical networks, apart from the function of IP packet transfer by means of conventional IP level processing in the router as described above.

Since the novel transfer not involving the network-layer processing can be implemented using hardware-based switching technology such as ATM, the load on software-based (network-layer) processing can be reduced, and thereby high-throughput, low-latency transfer of packets can be achieved.

For that purpose, a value entered in a specific field in the datalink frame (in the case of an Ethernet frame, the destination MAC address field or source MAC address field; in the case of an ATM cell, the VPI/VCI field) is defined locally (uniquely within at least one logical network) so that the router can explicitly recognize whether to transfer the datalink frame at the MAC frame/ATM cell level or to transfer the datalink frame by the ordinary IP processing.

By referring to this value that is entered in the received datalink frame, the router can decide whether to perform the ordinary IP processing or to perform only datalink processing to transfer the frame.

Now, the preferred embodiments according to the present invention will be described in more detail, taking an Ethernet frame (MAC frame) as an example of the datalink frame.

FIG. 4 shows an exemplary format of the MAC address defined for the Ethernet frame for which transfer at datalink-layer level is effected.

A virtual data link for transferring only specific communications, whereby transfer is performed by datalink level processing without carrying out the conventional IP-level processing, is defined; this link is called a "Dedicated Virtual Link" (DVL). The identifier indicating this link is called a "DVL identifier" (DVLI), and is associated with a respective DVL. That is, all Ethernet frames containing the same DVLI value in one Ethernet/Ethernet switch network carry only a specific communication.

The specific communication may be called a "flow", and the information for identifying the flow will be called "flow ID". The flow can be specified by any one or combination of source IP address field, destination IP address field, source port number, destination port number, and Flow ID of IPv6. Those addresses may be an address prefix indicating a network (not a node).

Figure 4A:
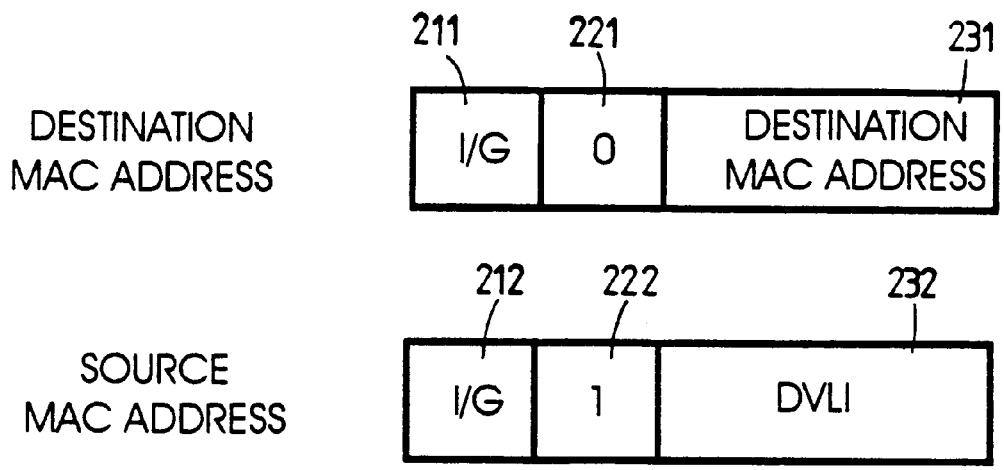
FIGS. 4(a) and (b) show examples of a DVLI entry in the Ethernet frame (MAC frame).

One method for entering the DVLI value into the Ethernet frame uses the source MAC address field (222) (FIG. 4(a)). Another method uses the destination MAC address field (223) (FIG. 4(b)). Alternatively, the LLC (Logical Link Control) header, which is further inwards than the MAC header, can be used.

A detailed description will now be given of a method in which the source or destination MAC address field is used.

Methods that make use of the MAC address field involve using an address format that is defined specially for the communication networks to which the present invention can be applied. To let nodes know that the address is special, for example, the U/L bits (222, 223) in the MAC address where the DVLI value is entered are set to 1 (indicating the address is local).

In a case where the DVLI value is entered in the source MAC address field (FIG. 4(a)), the ordinary MAC address of the node (router or host) that is to receive the frame is entered in the destination MAC address field. In a case where the DVLI value is entered in the destination MAC address field (FIG. 4(b)), the ordinary MAC address of the node (host or router) that sends the fame is entered in the source MAC address field. The U/L bits (221, 224) in these MAC addresses are normally set to 0 (indicating the address is universal).

If, as shown in FIG. 3(b), the Ethernet frame is converted into cells between router 342 and router 343 (ATM network section) of FIG. 3(a), a dedicated virtual link may be identified by the DVLI value entered in the MAC address field as described above. In this case, alternatively, a dedicated virtual link may be identified by the identifier (VPIIVCI) of the ATM connection entered in the cell header. In a case of FIG. 3(c), a dedicated virtual link may be identified by the identifier (VPI/VCI) of the ATM connection entered in the cell header.

In a case where the VPI/VCI of the cell header is used as an identifier of the dedicated virtual link, the VPI/VCI value of the transmitting side (router 342 of FIG. 3) may not the same as the VPI/VCI value of the receiving side (router 343 of FIG. 3), since the ATM switch may be placed between both ends of the ATM connection. In a case where the MAC address is used as an identifier of the dedicated virtual link, they will be identical.

Figure 5A:
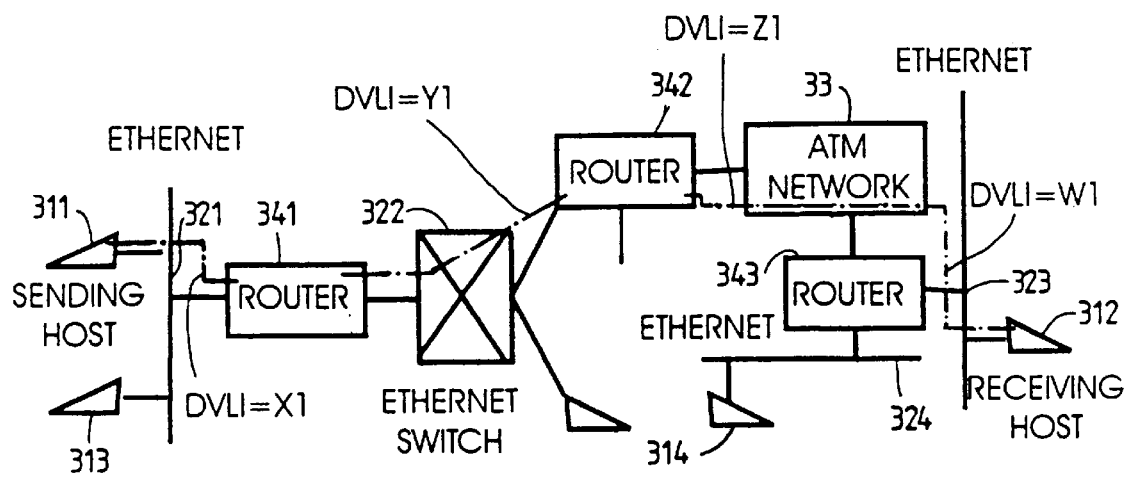
FIG. 5(a) shows an exemplary network topology.
Figure 5B:
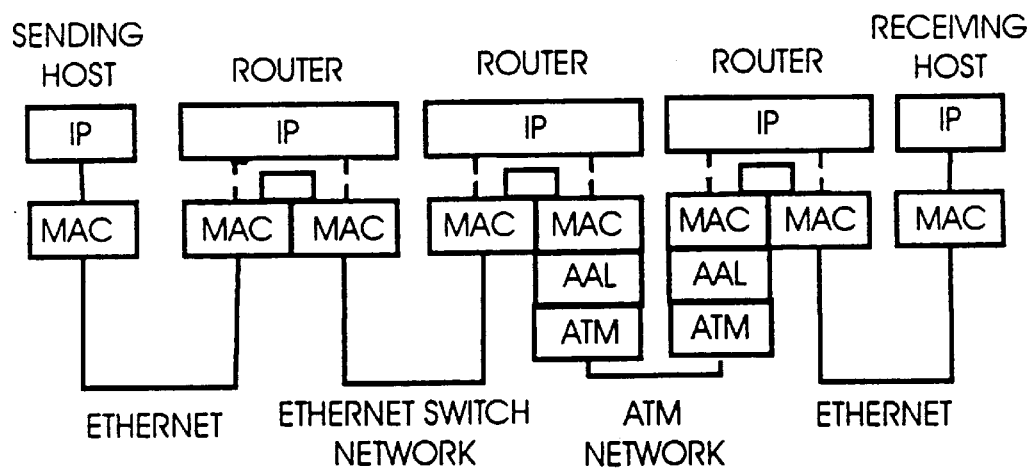
FIG. 5(b) illustrates a procedure of IP packet transfer according to the present invention in a case where an Ethernet frame is transferred over an ATM network.
Figure 6A:
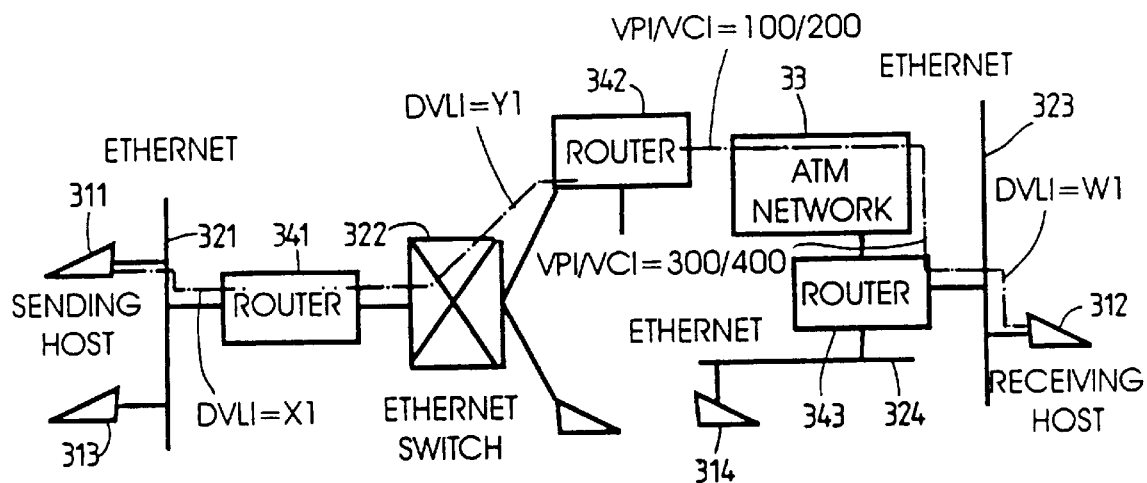
FIG. 6(a) shows an exemplary network topology and FIG. 6(b) illustrates a procedure of IP packet transfer according to the present invention in a case where an IP packet is transferred over an ATM network.
Figure 6B:
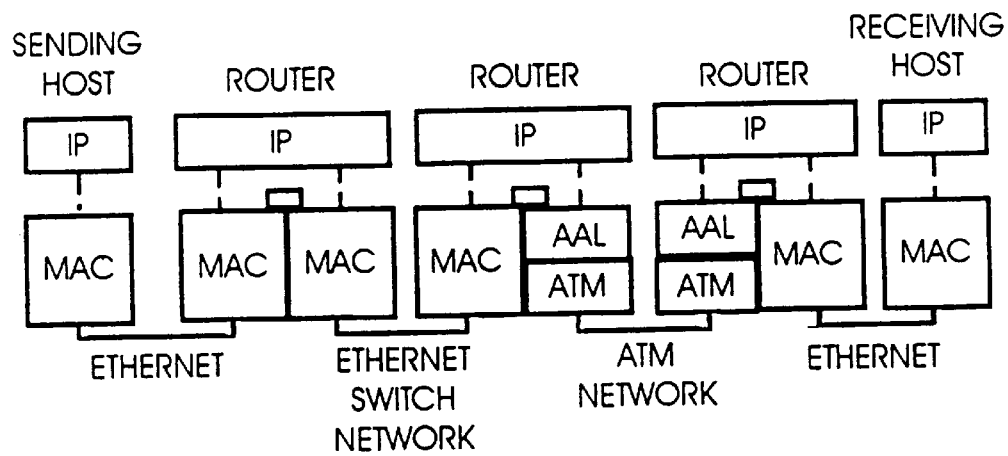

FIG. 5 and FIG. 6 respectively correspond to FIG. 3(b) and FIG. 3(c). They describe an exemplary way to transfer packets in accordance with the present invention at routers 341, 342, 343 when packets are transferred from sending host 311 to receiving host 312 in the networks shown in FIG. 3(a).

In both cases of FIG. 5 and FIG. 6, a DVLI value x1 is supplied in the header of the Ethernet frame between sending host 311 and router 341, while a DVLI value y1 is supplied in the header of the Ethernet frame between router 341 and router 342.

The way to transfer packets from router 342 to router 343 (in the ATM network section) is different in FIG. 5 and FIG. 6. FIG. 5 shows the case where the dedicated virtual link is identified by the DVLI value on the header of the Ethernet frame in the ATM network section; FIG. 6 shows the case where the dedicated virtual link is identified by the VPI/VCI value entered in the cell header in the ATM network section (VPI/VCI value 100/200 at the router 342 and VPI/VCI value 300/400 at the router 343).

Between router 343 and receiving host 312, a DVLI value w1 is supplied in the Ethernet frame header.

Figure 7:
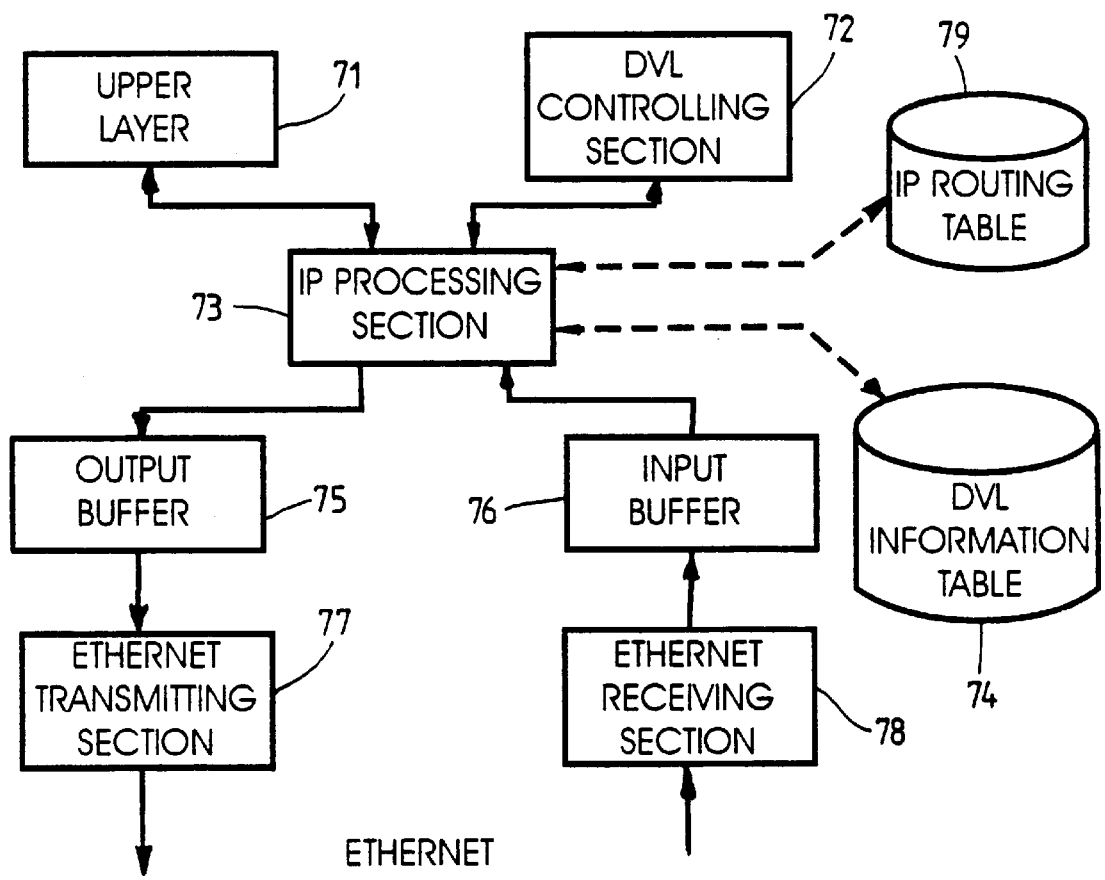
FIG. 7 shows an exemplary configuration of a sending node according to the present invention.

FIG. 7 shows a functional block diagram of sending host 311. IP processing section (module) 73 references IP routing table 79, using the flow ID of the packet received from upper layer 71 such as TCP/UDP. The flow ID may be the destination IP address, or may include more information such as the destination port number.

FIG. 8 shows an example of IP routing table 79. When the table is searched based on the flow ID (in the examples of FIGS. 5 and 6, the IP address of receiving host 312), an IP address of the next-hop node (router 341 in FIG. 5 and FIG. 6) is obtained. If there are more than one output interfaces, an output interface number corresponding to the next-hop node is also obtained. Furthermore, regarding a flow for which a dedicated virtual link is allocated, a pointer for searching dedicated virtual link information table 74 is written in IP routing table 79.

FIG. 9 shows an example of a dedicated virtual link information table 74. When the table is searched based on the pointer obtained from the IP routing table, an output datalink header to be affixed is obtained. If there are more than one output interfaces, an output interface number and type of datalink of this interface are also obtained.

Taking the transfer of data from sending host 311 to receiving host 312 of FIG. 5 and FIG. 6 as an example, in a case where the DVLI is entered into the source MAC address field, {(source MAC|U/L=1, DVLI value x1), (destination MAC|U/L=0, MAC address of next-hop router 341)} is obtained as data link header information; in a case where the DVLI is entered into the destination MAC address field, {(source MAC|U/L=0, MAC address of its own 311), (destination MAC|U/L=1, DVLI value x1)} is obtained as datalink header information.

Regarding packets for which output datalink header information including a DVLI value has been obtained, IP processing section 73 or output buffer 75 attaches the MAC header including the DVLI value based on the obtained information to the frame, as shown in FIG. 4. Then, the frame is transmitted from Ethernet transmitting section 77 to Ethernet 321.

In FIG. 8 and FIG. 9, there are entered information regarding packets from sending host 311 addressed to host 312 and information regarding packets from sending host 311 addressed to host 314. These are allocated respectively different dedicated virtual links (DVLI=x1 is allocated for a packet addressed to host 312, while DVLI=x2 is allocated for a packet addressed to host 314).

In contrast, if searching the IP routing table 79 did not discover any pointer for looking up dedicated virtual link information table 74 for a packet to be transmitted, and a flow of the packet does not need a dedicated virtual link to be set up (there is decided no need to perform special high-throughput, low-latency datalink transfer for the flow), IP processing section 73 or output buffer 75 attaches a MAC header including MAC address of its own 311 as source MAC and obtained MAC address of the next-hop router as destination MAC to the frame in accordance with the ordinary packet transfer method. If necessary, the next-hop MAC address is resolved based on the next-hop IP address. Then, the Ethernet frames are transmitted to Ethernet 321 from the Ethernet transmitting section 77.

In the case where any pointer for looking up dedicated virtual link information table 74 was not found for a packet to be transmitted on searching the IP routing table 79, but setup of a dedicated virtual link is desirable for a flow of the packet, the Ethernet frame is sent to the next-hop router by the ordinary packet transfer method, and also IP processing section 73 requests dedicated virtual link controlling section 72 of FIG. 7 to set up a new DVL to the next-hop router for this flow. An example of the detailed set up procedure for such a DVL will be described later.

The standard for decision as to whether or not it is desirable that packet transfer should be effected using such a dedicated virtual link may be, for example, whether or not the packets are going to a specific destination IP address, whether or not the packets have a specific source/destination IP address pair, or whether or not the packets have a specific port number (file transfer, WWW search, TELNET etc.), or a combination of these. Alternatively or additionally, apart from a decision process as above based on the content of the individual IP packets, DVL setup procedure for a specific flow may be commenced in response to a request from an upper layer, such as a quality of service request. A dedicated virtual link may be set up beforehand (before a packet of the flow arrives actually) for a flow going to a specific destination IP address (corresponding to a specific destination network or a specific destination node) or a specific source/destination IP address pair, by exchanging information background between nodes such as a routing protocol.

Figure 10:
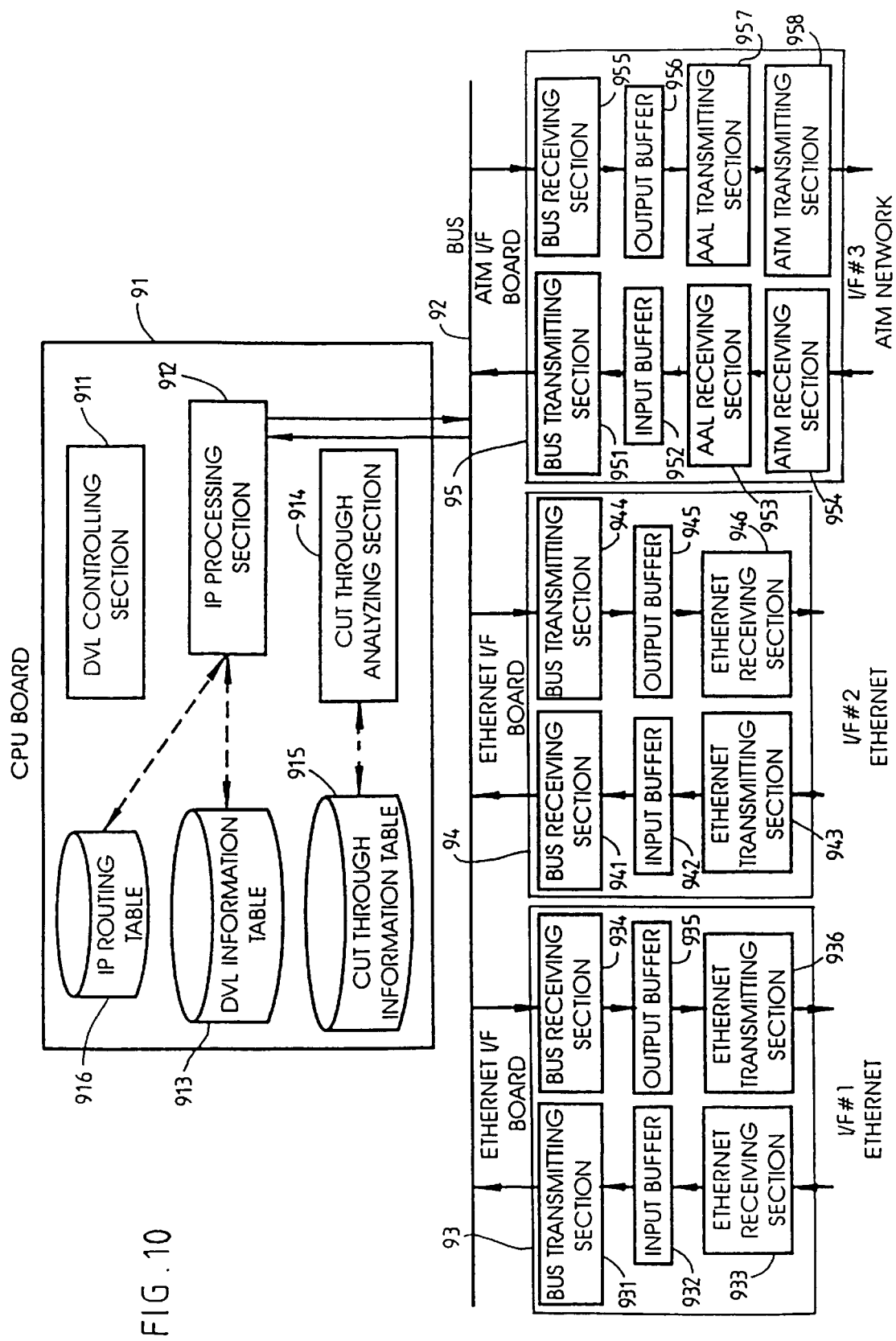
FIG. 10 shows an exemplary configuration of a router according to the present invention.

FIG. 10 shows a functional block diagram of routers 341, 342 and 343 in FIG. 5 and 6. This is a first example of the router configuration. A common bus 92 connects Ethernet interface boards 93, 94, ATM interface board 95, and a CPU board 91 that performs IP processing and operations related to dedicated virtual links.

A description of the router according to the present embodiments will be given below in order of router 341 (an exemplary router receiving packets from Ethernet and transmitting packets onto Ethernet), router 342 (an exemplary router receiving packets from Ethernet and transmitting packets onto ATM network), and router 343 (an exemplary router receiving packets from ATM network and transmitting packets onto Ethernet), taking a packet flow sent from sending host 311 to receiving host 312 as an example.

First, router 341 that performs transfer from an Ethernet to an Ethernet will be described. Since router 341 does not have an ATM interface, it may be described as shown in FIG. 10 with the ATM interface board 95 portion removed.

The interface on the Ethernet 321 side of router 341 is taken as being I/F #1 of FIG. 10 and the interface on the Ethernet switch 322 side is taken as being I/F #2 of FIG. 10. When Ethernet receiving section 933 receives an Ethernet frame from sending host 311, it accumulates the received frame in input buffer 932.

A way how each router decides whether or not an MAC frame is to be received by the Ethernet receiving section depends on whether the field in which the DVLI value is entered is the source MAC address field or destination MAC address field.

Specifically, in a case the DVLI value is entered in the source MAC address field (FIG. 4(a)), a frame including the address of its own as the destination MAC address is selected from the frames flowing on the Ethernet to be received by Ethernet receiving section 933, as ordinarily.

Figure 4B:
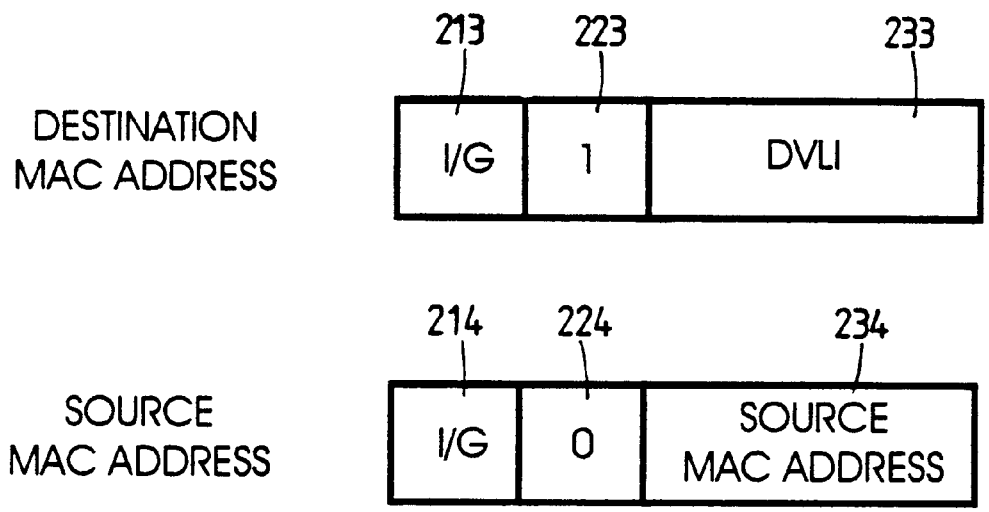

In a case the DVLI value is entered in the destination MAC address field (FIG. 4(b)), each router stores DVLI values corresponding to all the DVLs that is to be received by itself beforehand. Then, if a frame whereof the U/L bit value in the destination MAC address is 1 and the value of the destination MAC address is equal to one of the DVLIs stored in the router so as to be received by that router is flowing on the Ethernet, this frame is selected to be received by Ethernet receiving section 933 of the aforesaid router. In addition to the above reception, each router is to receive an ordinary frame whose U/L bit is 0 and whose destination MAC address is its own address.

CPU board 91, when it is notified of the receipt of an Ethernet frame from the input interface, reads out the value of the field in which the input DVLI value is entered (source or destination MAC address). Alternatively, it is possible that, on notification of reception, the interface board notifies the CPU board also of the value of the field where the input DVLI value is entered.

Cut-through analyzing section 914 in CPU board 91 investigates whether there is or is not a corresponding entry in cut-through information table 915 based on the input DVLI value that is thus read. Since, if the value of the U/L bits of the source/destination MAC address field is 0, it becomes clear immediately that there is no corresponding entry, cut-through analyzing section 914 can check initially only this bit and then, if its value is 1, reference cut-through information table 915.

FIG. 11 shows an example of the entries in cut-through information table 915. The table is looked up, using the input I/F number and input DVLI value of the received frame as a key. When it is recognized that a flow corresponding to an input DVL and a flow to a next-hop node corresponding to an output DVL are equivalent, DVL controlling section 911 enters the output I/F number and output DVLI value (or the entire output datalink header including the output DVLI value) into the corresponding entry.

In a case where the entire output datalink header is entered as an entry, the entry is created as follows. If the DVLI value is written in the source MAC address, {(source MAC|U/L=1, output DVLI value), (destination MAC|U/L=0, next-hop node MAC address)} is entered. If the DVLI value is written in the destination MAC address, {(source MAC|U/L=0, own MAC address), (destination MAC|U/L=1, output DVLI value)} is entered.

Furthermore, it is possible to include information indicating "priority" corresponding to the communication service quality class in the entry, so that the router can use the information in order to give priority to a specific flow in output processing onto a circuit in the output interface and/or in use of the bus and/or CPU.

There may be a case where, even though a frame of a specific flow has been received for which an input DVLI value has been allocated, an output DVL corresponding to this flow has not been allocated for some reason. In this case, the router can transfer the frame to the next-hop node by performing ordinary IP processing on the received frames.

However, even if the output DVL does not exist, the router can transfer frames at the datalink layer without IP processing. Specifically, once the router obtains the output I/F number and next-hop node MAC address etc. by performing IP processing on this flow, the router writes the obtained information into the output datalink header field of FIG. 11. Referring to the cut-through information table where the information has been written, the router can transfer a frame received with an input DVLI to the next-hop node by replacing the Ethernet header, without performing ordinary IP processing. In this case, the output datalink header field of FIG. 11 becomes {(source MAC|U/L=0, own MAC address), (destination MAC|U/L=0, next-hop node MAC address)}.

If, as a result of searching cut-through information table 915, information of output I/F and output datalink header (which may or may not contain a DVLI value) is obtained, the router can transfer the received frame from the input I/F where reception occurred (in this case I/F #1) to an adequate output I/F (in this case I/F #2), and can notify the output I/F of the datalink header information to be provided to the frame by the output I/F, without assembly into IP packets. The output I/F attaches the datalink header to the Ethernet frame to output it to Ethernet switch 322.

A method in which a header is attached to an output frame by an output interface board has been described above, but alternatively, an input interface board can attach the header. It is also possible to temporarily transfer the received frame to a main memory and attach the header there.

In contrast, as a result of the searching of cut-through information table 915, it is decided that the frame is subjected to ordinary IP processing, when there is no entry matching the input I/F number and input DVLI value, when a matching entry does exist but the corresponding output-side information is not yet entered, or when the output I/F obtained as a result of the searching indicates a CPU board. The frame is decided to be handed over to the IP processing section, also when it is found that the U/L bits of the MAC address to be used to include an input DVLI value is 0 (universal) prior to searching of the cut-through information table 915 (the received frame is in the ordinary header format). The frame for which the above decision has been made is transferred to CPU board 91, and then IP processing section 912 assemble an IP packet from the frames, extracts the flow ID from the IP packet, and searches IP routing table 916 using the flow ID as a key.

FIG. 12 shows an example of IP routing table 916. On looking up the table using the flow ID (in the case of FIG. 12, the sending host IP address and receiving host IP address pair) as a key, the output interface number and next-hop node IP address are obtained. In addition, for the flow to which a dedicated virtual link is allocated, a pointer value is entered for lookup of dedicated virtual link information table 913.

In the example of FIG. 12, for the flow from sending host 311 to receiving host 312 and the flow from sending host 313 to receiving host 314, pointers to the dedicated virtual link information table exist.

Regarding the flow from sending host 311 to receiving host 312, the IP routing table of FIG. 12 and the DVL information table is normally not referred to in fact, since the frames of this flow are transferred with a DVLI attached from the upstream node and are output without passing through the IP processing section by referencing the cut-through information table of FIG. 11. However, if the DVL between sending host 311 and router 341 becomes unusable for some reason and the frames in the ordinary frame format arrive at router 341, the frames can be transferred with the DVLI attached to next-hop router 342 through the IP processing section, by referencing the IP routing table of FIG. 12 and the dedicated virtual link information table indicated by the pointer.

FIG. 13 shows an example of dedicated virtual link information table 913. When the table is searched using the pointer obtained from the IP routing table as a key, an output interface number (and the datalink type of the interface) and information regarding an output datalink header are obtained.

In the example of FIG. 13, the entries respectively corresponding to pointer values 200 and 201 of FIG. 12 exist. By referring to FIG. 12 and 13, the flow from sending host 311 to receiving host 312 is transmitted from output interface 2 to next-hop router 342 with DVLI value yl attached, while the flow from sending host 313 to receiving host 314 is transmitted from output interface 2 to next-hop router 342 with DVLI value y3 attached.

The content entered in the output datalink header field of the dedicated data link information table of FIG. 13 differs depending on where the DVLI is to be attached.

Taking pointer value 201 as an example, in a case where the DVLI is entered into the source MAC address field, {(source MAC|U/L=1, DVLI value y3), (destination MAC|U/L=0, next-hop router 342 MAC address)} is obtained as the datalink header information. In a case where the DVLI is entered into the destination MAC address field, {(source MAC|U/L=0, own MAC address), (destination MAC|U/L=1, DVLI value y3)} is obtained as the datalink header information.

In this way, in respect of the packet whose output datalink header information was obtained by referencing to the dedicated virtual link information table, the frame with a MAC header including the obtained information is sent to Ethernet switch 322 by Ethernet transmitting section 946.

In contrast, if searching the IP routing table 916 did not result in obtaining any corresponding pointer for looking up dedicated virtual link information table 913, and the flow does not need a dedicated virtual link to be set up (there is decided no need to perform special high-throughput, low-latency datalink transfer for the flow), IP processing section 912 or output buffer 945 attaches a MAC header including MAC address of its own 341 as source MAC and obtained MAC address of next-hop router 342 as destination MAC to the frame in accordance with the ordinary packet transfer method. This situation occurs in respect of the frame going from source host 311 to receiving host 314 in FIG. 12. If necessary, the next-hop MAC address is resolved based on the next-hop IP address. Then, the Ethernet frames are transmitted to router 342 through Ethernet switch 322 from the Ethernet transmitting section 946 of output interface 2.

In the case where any pointer for looking up dedicated virtual link information table 913 was not found for a packet to be transmitted on searching the IP routing table 916, but setup of a dedicated virtual link is desirable for a flow of the packet, the Ethernet frame is sent to the next-hop router by the ordinary packet transfer method, and also IP processing section 912 requests dedicated virtual link controlling section 911 of FIG. 10 to set up a new DVL to the next-hop router for this flow. An example of the detailed set up procedure for such a DVL will be described later.

If router 341 succeeds in setting up a new DVL to next-hop router 342 and a DVL exists for the same flow between router 341 and host (upstream node) 311, router 341 becomes able to write the correspondence relationship between the input DVLI from host 311 and the output DVLI to router 342 in cut-through information table 915, and subsequent received frames belonging to this flow can then be transferred simply by rewriting the datalink header information, without going through the IP processing section.

Next, a router that transfers packets from an Ethernet to an ATM network will be described. The configuration of router 342 may be as shown in FIG. 10 with the Ethernet interface #2 portion removed.

First, the case where ATM cells are sent after the MAC-layer processing is applied to an IP packet or Ethernet frame will be described, taking router 342 of FIG. 5 as an example.

The processing procedures from frame reception to frame transmission are practically the same as was described with reference to router 341. The difference is that, since the output interface is ATM, the Ethernet frame to be sent are converted into ATM cells and output onto an ATM-VC (Virtual Connection) that is set up to next-hop router 343.

Figure 14A:
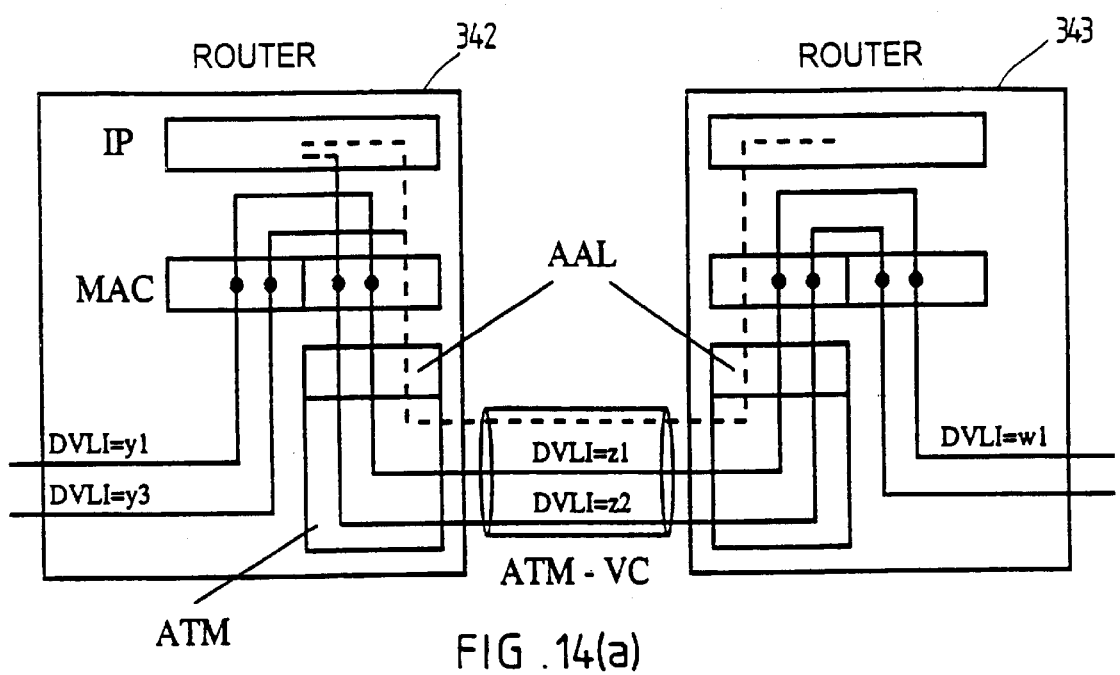
FIGS. 14(a) and (b) illustrate exemplary relationships between received Ethernet frames and ATM connections that transfer Ethernet frames.

FIG. 14 shows two exemplary methods of utilizing the ATM-VC. In a first method, as shown in FIG. 14(a), all the frames are transferred through one ATM-VC set up between router 342 and router 343. In this case, for example, the Ethernet frames with DVLI=Z1 to router 343 and the Ethernet frames with DVLI=Z2 to router 343, as well as other ordinary Ethernet frames with no DVLI, are all transferred through a common ATM-VC. In other words, the first method determines an ATM-VC to be used for output solely on the basis of the MAC address of next-hop node (router 343).

Figure 14B:
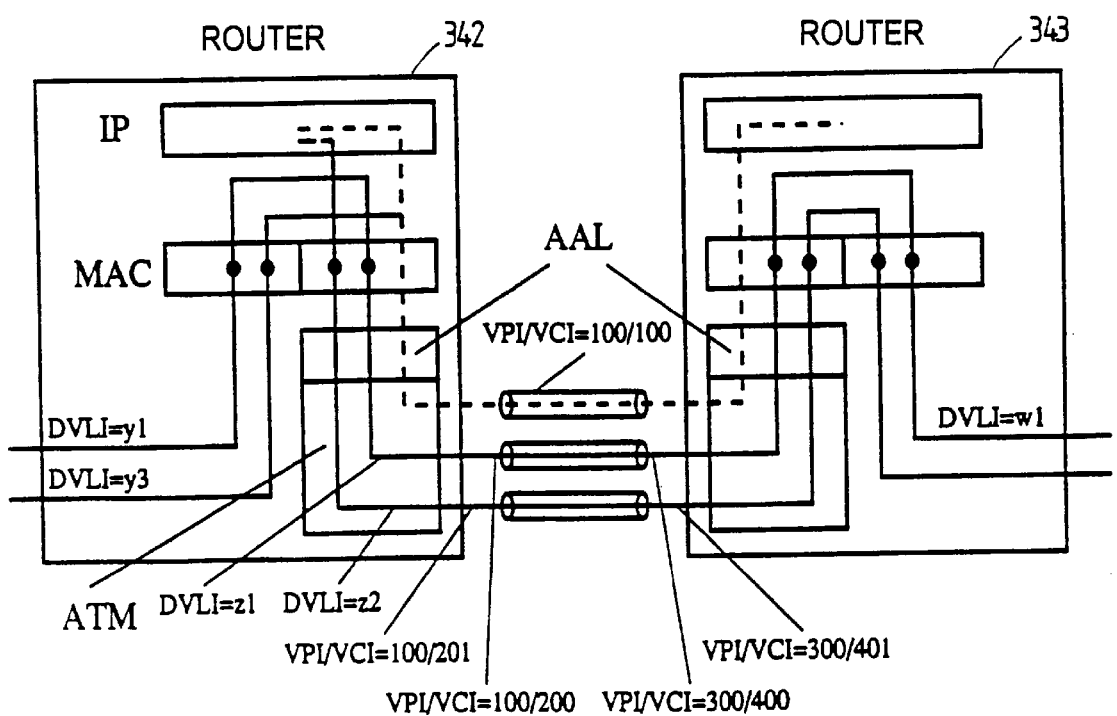

In a second method, as shown in FIG. 14(b), a plurality of ATM-VCs are set up between router 342 and router 343, and the router selects one of the ATM-VCs on case-by-case basis. In this case, for example, the Ethernet frames with DVLI=Z1 to router 343 are transferred through ATM-VC1 (in the output ATM interface of router 342, VPI/VCI=100/200; in the input ATM interface of router 343, VPI/VCI=300/400), and the Ethernet frames with DVLI=Z2 to router 343 are transferred through ATM-VC2 (in the output ATM interface of router 342, VPI/VCI=100/201; in the input ATM interface of router 343, VPI/VCI=300/401), while other Ethernet frames with no DVLI are transferred through ATM-VC0. ATM-VC1 is dedicated to the flow corresponding to Z1, and ATM-VC2 is dedicated to the flow corresponding to Z2, while ATM-VC0 is a default VC.

To implement the second method, if an output DVLI value is allocated to a given flow between the router and a next-hop node, the router determines the ATM-VC to be used for output based on the output DVLI value. Specifically, the cut-through information table of FIG. 11 or the dedicated virtual link information table of FIG. 13 is constructed so that the output VPI/VCI value can be obtained in addition to the output datalink header as a result of searching. Alternatively, the router has another table in which the correspondence relationship of the output datalink header and the output VCI/VCI value is stored.

The second method requires a relatively large number of VCs in the network, but has an advantage that it becomes possible to specify an adequate bandwidth (or QOS) for each IP flow corresponding to each DVL by exclusively allocating an ATM-VC and reserving the bandwidth (sufficient for the specified QOS) for the ATM-VC.

Next, the case where ATM cells are sent by converting an IP packet directly to cells without the MAC-layer processing will be described, taking router 342 of FIG. 6 as an example.

The processing procedures from frame reception up to frame transmission are practically the same as has already been described with reference to router 341. The difference lies in that the output interface is ATM and IP packets encapsulated with a prescribed link control header (specified in IETF Request For Comments (RFC) 1483) are directly converted to ATM cells, without performing MAC-layer processing, before being output onto the ATM-VC which has been set up to next-hop router 343. The contents of the cut-through information table of FIG. 11 and the dedicated virtual link information table of FIG. 13 are therefore different.

FIG. 15 shows an example of the cut-through information table in this case. The table of FIG. 15 is searched using as the input I/F number of the received frame and input DVLI value as a key. If it is found that a flow corresponding to an input DVL is equivalent to a flow corresponding to an output VC to a next-hop node (in this case, router 343), an entry comprising the output I/F number and output datalink header information is created in the cut-through information table. The output datalink header information includes a VPI/VCI value and information regarding encapsulation of the packet (logical link control header).

This entry can also record the type of the datalink so as to distinguish whether the output interface is ATM or an Ethernet/Ethernet switch network. It is also possible for the entry to contain information indicating "priority" corresponding to a communication service quality class.

Let us now consider a case where, though a frame of a specific flow has been received to which an input DVLI value has been attached, an output dedicated VC corresponding to this flow has not been allocated for some reason. In this case also, the router can obtain information indicating a next-hop node by subjecting the received frame to ordinary IP processing, and can write the output I/F number and VPI/VCI value corresponding to the VC connected to the next-hop node into the output datalink header field of FIG. 15. In this case, the VC written into the cut-through information table will be a default VC to the next-hop node, instead of a VC dedicated to the flow.

Referring to the above cut-through information table, the router can transfer subsequent frames received with the input DVLI onto the default VC to the next-hop node, without performing ordinary IP processing. For example, even though a dedicated VC to next-hop router 343 for the flow corresponding to input DVLI y3 is not present, an entry including the default VC (VPI/VCI=100/100) to next-hop router 343 as the output datalink header information can be created in FIG. 15, so that packets can be transferred to next-hop router 343 without IP processing.

If, as a result of searching cut-through information table 915, information of output I/F and output datalink header (which contains a VPI/VCI value of a VC dedicated to the specific flow or of a default VC to the next-hop node) is obtained, the router can transfer the received frame from the input I/F where reception occurred (in this case I/F #1) to an adequate output I/F (in this case I/F #3), and can notify the output I/F of the VPI/VCI to be provided to the cells by the output I/F, without assembly into IP packets. The output I/F attaches the VPI/VCI to the cells made of the received frame to output them to ATM network 33.

In contrast, as a result of the searching of cut-through information table 915, it is decided that the frame is subjected to ordinary IP processing, when there is no entry matching the input I/F number and input DVLI value, when a matching entry does exist but the corresponding output-side information is not yet entered, or when the output I/F obtained as a result of the searching indicates a CPU board. The frame is decided to be handed over to the IP processing section, also when it is found that the U/L bits of the MAC address is 0 (universal) prior to searching of the cut-through information table 915 (the received frame is in the ordinary header format). The frame for which the above decision has been made is transferred to CPU board 91, and then IP processing section 912 assemble an IP packet from the frames, extracts the flow ID from the IP packet, and searches IP routing table 916 using the flow ID as a key.

FIG. 16 shows an example of IP routing table 916 of router 343. FIG. 17 shows an example of dedicated virtual link information table 913. When the DVL information table is searched using the pointer obtained from the IP routing table as a key, the output interface number (and the datalink type of the interface) and information regarding the output datalink header are obtained. The difference from FIG. 13 is that the obtained output datalink header information is a VPI/VCI value.

By referring to FIG. 16 and FIG. 17, router 342 transmits the flow from sending host 311 to receiving host 312 through output interface 3 to next-hop router 343 with a VPI/VCI value of 100/200 attached thereto, while transmitting the flow from sending host 311 to receiving host 314 through output interface 3 to next-hop router 343 with a VPI/VCI value of 100/202 attached to the cells.

Figure 18:
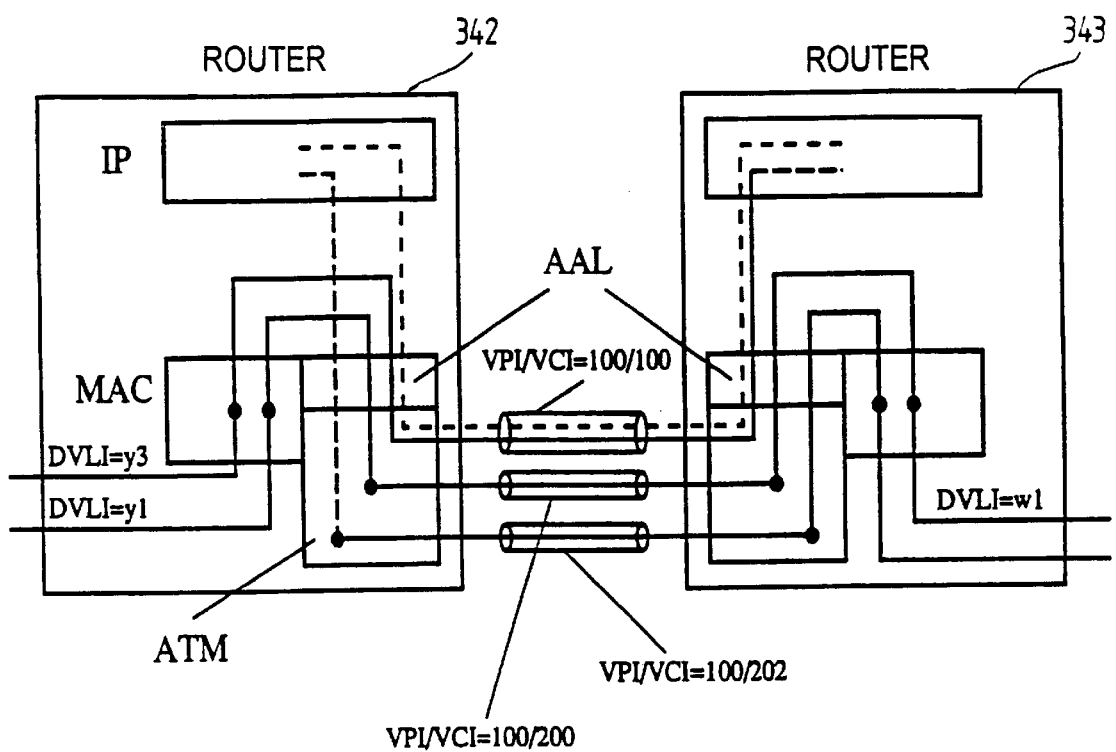
FIG. 18 illustrates an exemplary relationship between received Ethernet frames and ATM connections that transfer IP packets.

In this case (where an IP packet is directly converted into cells), ATM-VCs are used as shown in FIG. 18. As in the case of FIG. 14(b), a plurality of VCs are set up between router 342 and router 343, and the router make proper use of the VCs for each flow.

An Ethernet frame received from router 341 with DVLI=y1, in accordance with the cut-through information table shown in FIG. 15, is transferred onto a VC of VPI/VCI=100/200 (dedicated VC for the flow between sending host 311 and receiving host 312) to next-hop router 343, without searching the IP routing table.

An Ethernet frame received from router 341 with DVLI=y3, in accordance with the cut-through information table shown in FIG. 15, is transferred onto a VC of VPI/VCI=100/100 (default VC between router 342 and 343) to next-hop router 343, without searching the IP routing table. The frames constituting this flow are received with the DVLI from upstream router 341, so the router may decide that setup of a dedicated VC to next-hop router 343 is desirable. If the router makes that decision, the dedicated virtual link controlling section sets up the required dedicated VC.

The IP flow from sending host 311 to receiving host 314 is received from router 341 in an ordinary Ethernet frame format (without any DVLI being attached). Then, by searching the IP routing table (FIG. 16) and dedicated virtual link information table FIG. 17), the cells of the IP packet are output onto a VC of VPI/VCI=100/202 (dedicated VC for the flow between sending host 311 and receiving host 314) to next-hop router 343.

Lastly, router that transfers packets from an ATM network to an Ethernet will be described. The configuration of router 343 may be as shown in FIG. 10 with the Ethernet interface #2 portion removed.

First, the case where Ethernet frames, converted into ATM cells and having a DVLI attached, are received from the ATM network will be described, taking router 343 of FIG. 5 as an example.

The processing procedures from frame receipt to frame transmission are practically the same as was described with reference to routers 341 and 342. The difference is that the input interface is ATM.

As shown in FIG. 14, two ways of utilizing an ATM-VC may be considered. If, as in FIG. 14(a), all frames are transferred through one VC set up between router 342 and router 343, router 343 determines whether to transfer packets at the datalink layer or at the network layer in accordance with whether or not the Ethernet frame assembled from the received ATM cells contains a DVLI value, just as in the case where frames are received from an Ethernet.

If, as shown in FIG. 14(b), a plurality of ATM-VCs are set up between router 342 and router 343 and respective dedicated virtual links are associated with these VCs, further two methods of transfer at router 343 may be considered.

In one method, router 343 assembles an Ethernet frame from the received cells and then transfers the frame in accordance with the DVLI value, as in the case of FIG. 14(a). In this case, the difference between ATM and Ethernet is not particularly reflected in the transfer processing.

In another method, router 343 determines how to transfer in accordance with the VPI/VCI value of the received cells. In this case, if the VPI/VCI value of a cell corresponds to a dedicated virtual link (1)VL) that has been allocated to a specific flow, router 343 transfers a frame made of the received cells using this VPI/VCI value. If the received VPI/VCI value is that of a default VC shared by frames belonging to a number of flows for transfer between routers 342 and 343, router 343 transfers the frame in accordance with the content of the frame that is assembled from the cells.

Next, the case where ATM cells generated by converting directly an IP packet with encapsulation information are received will be described, taking router 343 of FIG. 6 as an example.

In this case, since a frame that is assembled from the received cells does not include information for identifying a dedicated virtual link, the dedicated virtual link is identified by the VPI/VCI value in the cell header.

A method for transferring a frame made of the received cells using the VPI/VCI value is as follows. FIG. 19 shows an example of the cut-through information table held in router 343. The table is searched using the input I/F number of the received cells and their input VPI/VCI value as a key when the cells are received from an ATM interface. If it is found that a flow corresponding to an input VC is equivalent to a flow corresponding to an output DVL to a next-hop node (in this case, receiving host 312), an entry comprising the output I/F number and output datalink header information is created in the cut-through information table.

The entry can also record the type of datalink The output data link header information includes the value of the MAC address field (that may or may not contain the DVLI value) if the output interface is an Ethernet or Ethernet switch network.

Although not shown in FIG. 5 and FIG. 6, in a case where ATM cells are received from an ATM interface through a VC dedicated for a specific flow and transferred to another ATM interface, it is possible to transfer the received cells onto a VC dedicated for the aforesaid flow without assembly of the cells. In this case, the output VPI/VCI value is entered in the output datalink header field of FIG. 19, and then the cells are transferred like an ordinary ATM switch.

Let us now consider a case where, though cells are received to which a VPI/VCI value dedicated for a specific flow is attached, an output dedicated virtual link corresponding to this flow has not been allocated for some reason. In this case also, the router can obtain information indicating a next-hop node by subjecting an IP packet assembled from the received cells to ordinary IP processing, and can write the output I/F number and output datalink header information (destination MAC address, etc.) into the cut-through information table of FIG. 19.

Referring to the above cut-through information table, the router can transfer subsequent cells received with the input VPI/VCI to the next-hop node, attaching an Ethernet header, without performing ordinary IP processing. For example, even though a DVL to the next-hop node for the flow from sending host 313 to receiving host 314, corresponding to input VPI/VCI=300/401, is not present, an entry including the source MAC address (router 343) and destination MAC address (receiving host 314) etc. that are to be attached to an Ethernet frame as the output datalink header information can be created in FIG. 19, so that packets can be transferred to receiving host 314 without IP processing.

If, as a result of searching cut-through information table 915, information of the output I/F and output datalink header (a DVLI value may or may not be included) is obtained, the router can transfer the received cells from the receiving input I/F to an adequate output I/F and can give an adequate datalink header to the frame made of the cells, without analysis of information contained in the cells at the IP packet level.

In contrast, as a result of the searching of cut-through information table 915, it is decided that the frame is subjected to ordinary IP processing, when there is no entry matching the input I/F number and input VPI/VCI value, when a matching entry does exist but the corresponding output-side information is lacking, or when the output I/F obtained as a result of the searching indicates a CPU board. The cells for which the above decision has been made are assembled into a packet and transferred to CPU board 91, and then IP processing section 912 extracts the flow ID from the IP packet, and searches IP routing table 916 using the flow ID as a key.

FIG. 20 shows an example of IP routing table 916 of router 343. FIG. 21 shows an example of dedicated virtual link information table 913. The operation using these table is practically the same as in the case of router 341.

Finally, the frames arrive at a receiving host. FIG. 7 also shows a functional block diagram of receiving host 312. The frames are received by Ethernet receiving section 78 and accumulated in input buffer 76.

The host may, ordinarily, remove the datalink headers from the received frames and then process an IP packet assembled from the frames by IP processing section 73. The IP packet may be analyzed at upper-layer 71 to be handed over to the appropriate upper-layer application.

Alternatively, the host may reference cut-through information table (not shown in FIG. 7) using the datalink header information in the input buffer 76 as a key and then hand over the received data to the appropriate upper-layer application without performing IP processing and/or analysis at the upper layer. This becomes possible when a DVLI value is contained in the datalink header and the DVLI corresponds to a flow specified not just by the destination IP address but also by, for example, the destination port of the transport layer (UDP/TCP). In this case, cut-through information table stores a correspondence relationship of information regarding the destination port and the DVLI value in order to realize the above cut-through of IP processing.

Though the description of the above embodiments has been given based on the example of FIG. 5 and FIG. 6, the above embodiments can also be practiced in a case where Ethernet 321, Ethernet switch 322 and Ethernet 323 are replaced by ATM networks that transfer Ethernet frames converted to cells.

Further examples of configuration of routers 341, 342 and 343 are shown below.

Figure 22:
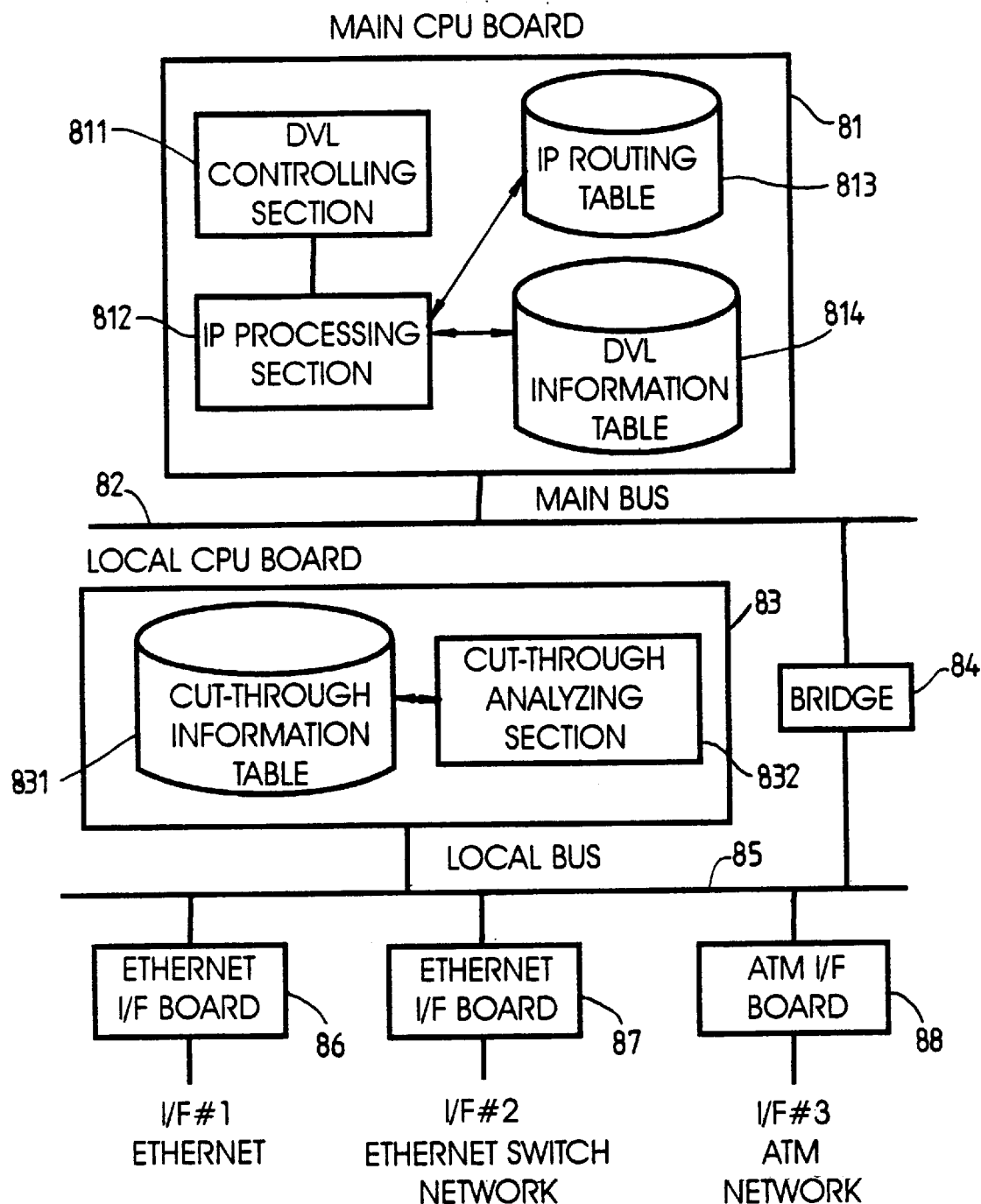
FIG. 22 shows another (second) exemplary configuration of a router according to the present invention.

FIG. 22 is a second exemplary configuration. This differs from FIG. 10 in that it is divided into a local-CPU board that controls transfer between the interface cards without going through the IP processing, and a main-CPU board that performs IP processing. Also, in FIG. 22, it is divided into a local bus that accommodates the local-CPU board that chiefly controls cut-through transfer between the interfaces and a main bus that accommodates the main-CPU board that performs IP processing.

These two buses are connected by means of a bridge. This configuration can separate the processing involved in the conventional IP transfer from the processing involved in the cut-through transfer by using different CPUs, and the bus load for performing IP processing can be lightened.

Figure 23:
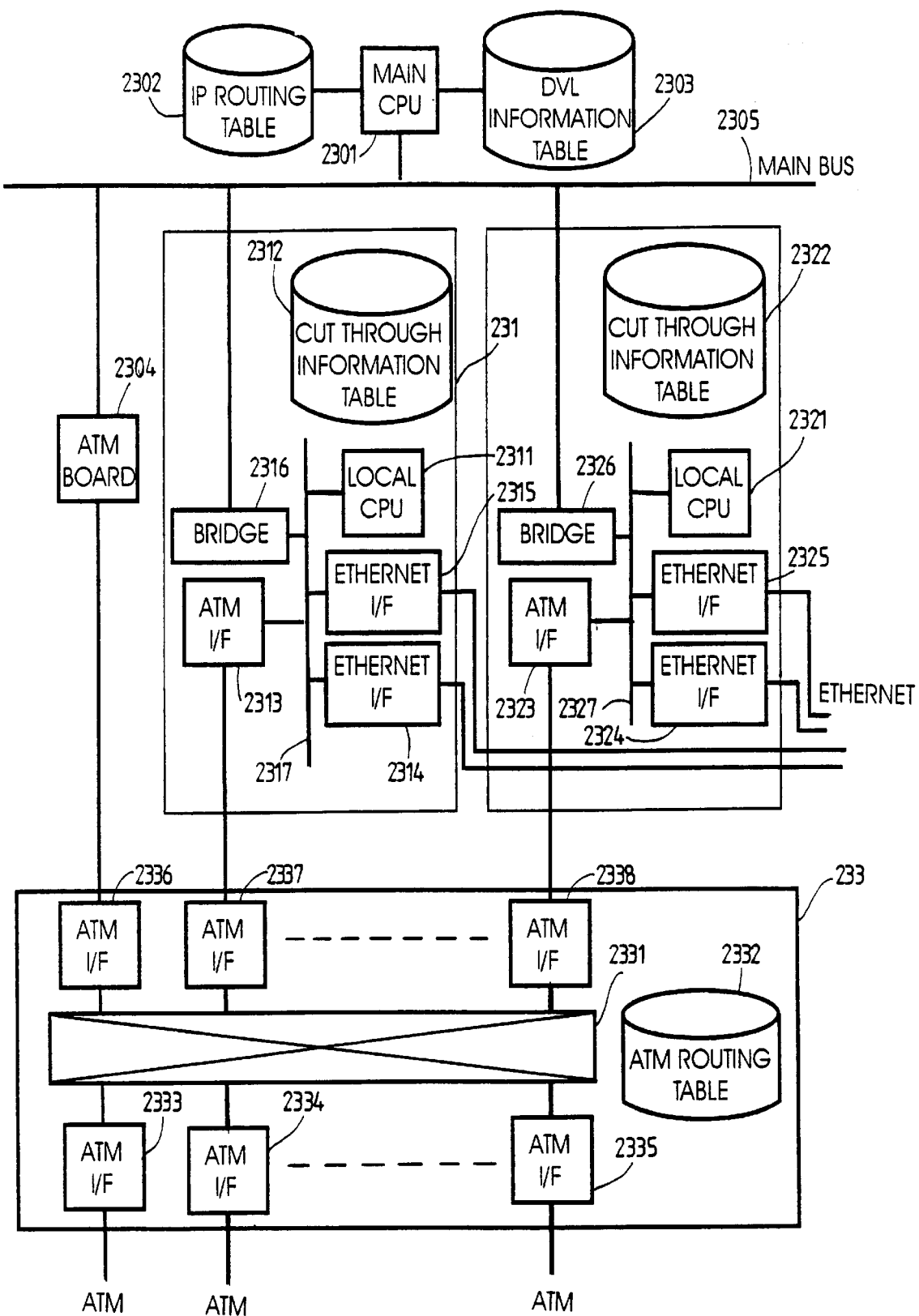
FIG. 23 shows yet another (third) exemplary configuration of a router according to the present invention.

FIG. 23 shows a third exemplary configuration of router 341, 342 or 343. In FIG. 23, a router accommodates a plurality of ATM interfaces and employs an ATM switch 233 in providing a transfer route for cut-through use between the interfaces. This configuration can efficiently achieve the transfer between Ethernet and Ethernet, between Ethernet and ATM, and between ATM and ATM in accordance with the principle of the present invention, i.e., conventional transfer using the IP header and cut-through transfer using a dedicated virtual link.

ATM switch 233 includes switch interfaces 2333~2338 and switching device 2331. Switch interfaces 2333~2335 are connected with the ATM network, and switch interfaces 2336~2338 are connected with other modules in the router.

Main CPU 2301, similar to main CPU 81 of FIG. 22, performs IP processing and processing relating to control of dedicated virtual links, e.g., sending and receiving of control messages, management of storage units relating to the dedicated virtual links (IP routing table 2302 and dedicated virtual link information table 2303), etc.

ATM board 2304 provides a route whereby information processed by main CPU 2301 (e.g., ordinary datalink frames or IP packets, and control messages) is exchanged with the ATM network.

ATM/Ethernet boards 231 and 232 accommodate Ethernet interfaces and a small number of ATM interfaces. Packet transfer between these interfaces and packet transfer between each interface and main CPU 2301 through bridge 2316 or 2326 are performed through local bus 2317 or 2327.

Local CPUs 2311 and 2321, similar to local-CPU 83 of FIG. 22, analyze the received datalink frame and decide whether ordinary transfer by analyzing the IP header or cut-through transfer by using dedicated virtual link information is to be performed, referring to cut-through information tables 2312 and 2322 respectively.

A manner of transfer in a router of FIG. 23 will now be described.

First, a case when Ethernet interface 2324 has received a frame from an Ethernet is explained. Local CPU 2321 checks whether or not the received frame contains valid DVLI information, by referring to cut-through information table 2322.

If the received frame is a conventional frame, i.e., does not contain a DVLI value, the frame is transferred through bridge 2326 and local bus 2327 to main CPU 2301 with the frame header removed. Main CPU 2301 analyzes the packet information by referring to IP routing table 2302 and transfers the packet to an adequate output interface. At this time, if the packet belongs to a flow to which a dedicated virtual link has been allocated, a pointer to the dedicated virtual link information table 2303 is obtained by referencing to the IP routing table, so that the dedicated virtual link identification information (DVLI or VPI/VCI) that is to be attached is obtained.

If a result of searching the IP routing table indicates that the output interface is Ethernet interface 2315, the packet is transferred from main CPU 2301 via main bus 2305 and bridge 2316 to Ethernet interface 2315, and is output with the adequate Ethernet header attached.

If a result of searching the IP routing table indicates that the output interface is ATM interface 2333, the packet is transferred from main CPU 2301 through main bus 2305 and ATM board 2304, which divides the packet into cells and attaches a prescribed VPI/VCI to the cells, to switch interface 2336 of ATM switch 233. Switch interface 2336 examines the VPI/VCI value of the received cell, and then sends the cell to output interface 2333 (with the VPI/VCI value rewritten if necessary).

If the received Ethernet frame includes a DVLI value, local CPU 2321 refers to cut-through information table 2322 using the information of input interface 2324 and the input DVLI value, thereby obtaining the output interface and output datalink header information. If the output interface is Ethernet, the output datalink header is an Ethernet header; if the output interface is ATM, the output datalink header is a VPI/VCI value (and encapsulation information of the packet, e.g., an LLC/SNAP encapsulation header in a case where a packet is converted into cells without going through the MAC layer processing).

If the cut-through information table shows that the output interface is Ethernet, local CPU checks whether or not this output Ethernet interface and the input Ethernet interface are on the same ATM/Ethernet board. If they are on the same board (e.g., 2325), the frame is transferred directly to the output interface through local bus 2327. If they are on different boards (e.g., the output interface is 2315), the frame is transferred to the output interface through: local bus 2327~ATM interface 2323~ATM switch 2331 ATM interface 2313~local bus 2317.

If the cut-through information table shows that the output interface is ATM, the cells are transferred to the final output interface (e.g., 2334) through: local bus 2327~ATM interface 2323~ATM switch 2331. In this process, there is a possibility that the VPI/VCI value of the cells that are finally output from 2334 may not be the same as the VPI/VCI value of the cells between ATM interface 2323~switch interface 2338. In this case, it is preferable to store the correspondence relationship between the VPI/VCI of cells transferred from ATM interface 2323 to switch interface 2338 and the VPI/VCI of cells output from the ATM interface 2334, in ATM routing table 2332 of the ATM switch. In this case also, from outside of the router, it seems that the correspondence relationship between the input DVLI and the output VPI/VCI (VPI/VCI of cells output from the ATM interface 2334) exists in the router.

Next, a case when ATM switch interface 2333 has received cells from a ATM network is explained. The switch interface refers to ATM routing table 2332 using the VPI/VCI value of the received cell, in order to find an output interface of the ATM switch and a VPI/VCI value to be attached to the cell output from ATM switch. ATM routing table 2332 may be the same as the table for cell transfer provided in an ordinary ATM switch, and stores the correspondence relationship between the input switch interface, input VPI/VCI and output switch interface, output VPI/VCI.

If ATM routing table 2332 indicates that the output switch interface is switch interface 2336 connected to ATM board 2304, this means that the cells are to be processed by IP. Specifically, ATM board 2304 assembles a packet from the cells and sends the packet to main CPU 2301 through main bus 2305. The main CPU searches IP routing table 2302 (and dedicated virtual link information table 2303 if a dedicated virtual link is allocated on the output side) using the flow identifier as a key, and transfers the packet to the obtained output interface.

If a result of searching IP routing table 2302 is that the output interface is ATM (e.g., 2335), the packet is transferred to switch interface 2336 of ATM switch 233 via ATM board 2304 with the obtained VPI/VCI. Switch interface 2336 refers to ATM routing table 2332 based on the VPI/VCI value received, and thereby sends the received cells to output interface 2335. The output VPI/VCI value attached to the cells output from interface 2335 in this case can be of a default VC (VC not dedicated to a specific flow) or can be of a VC dedicated to a specific flow.

If a result of searching IP routing table 2302 is that the output interface is Ethernet (e.g., 2325), the packet is transferred to Ethernet interface 2325 by way of main bus 2305~bridge 2326~local bus 2327, and is output with an adequate Ethernet header attached (if a DVL has been allocated to this flow, the Ethernet header includes a DVLI; otherwise, the Ethernet header is in an ordinary format not containing a DVLI).

If ATM routing table 2332 indicates that the output switch interface is an interface (e.g., 2337) connected to an ATM/Ethernet board (e.g., 231), this means that at least the input VPI/VCI is dedicated to a specific flow. Thus, ATM interface 2313 of ATM/Ethernet board 231 connected to switch interface 2337 notifies local CPU 2311 of the input VPI/VCI. Local CPU 2311 refers to cut-through information table 2312 in order to obtain the output interface number (e.g., 2314) and output datalink header information.

In this example, the output interface is Ethernet, so the output datalink header information relates to an Ethernet header, and includes an output DVLI if a DVL for this flow exists. If, for some reason, a DVL has not been allocated on the output side, an ordinary header format (source/destination MAC address pair, not containing a DVLI) is obtained. After the obtained Ethernet header is attached, the frame is output from Ethernet interface 2314.

If ATM routing table 2332 indicates that the output switch interface is another interface (e.g., 2334) connected to an ATM network, this means that the output VPI/VCI in switch interface 2334 is allocated to the flow designated by the input VPI/VCI. In this case, the output interface and output VPI/VCI are obtained, and the cell is output from output interface 2334 simply by rewriting the VPI/VCI value as in an ordinary ATM switch. If, for some reason, a dedicated VPI/VCI for this flow is not allocated on the output side, the VPI/VCI of the default VC (VC not dedicated to a specific flow) is obtained As described above, in the third exemplary configuration, a bus and a CPU are used for transferring packets to be processed by IP or control messages, while an ATM switch in the interior of the router is used for cut-through transfer based on the input dedicated virtual link identification information (DVLI or VPI/VCI). This can achieve the frame transfer with higher rate and higher throughput.

Figure 24:
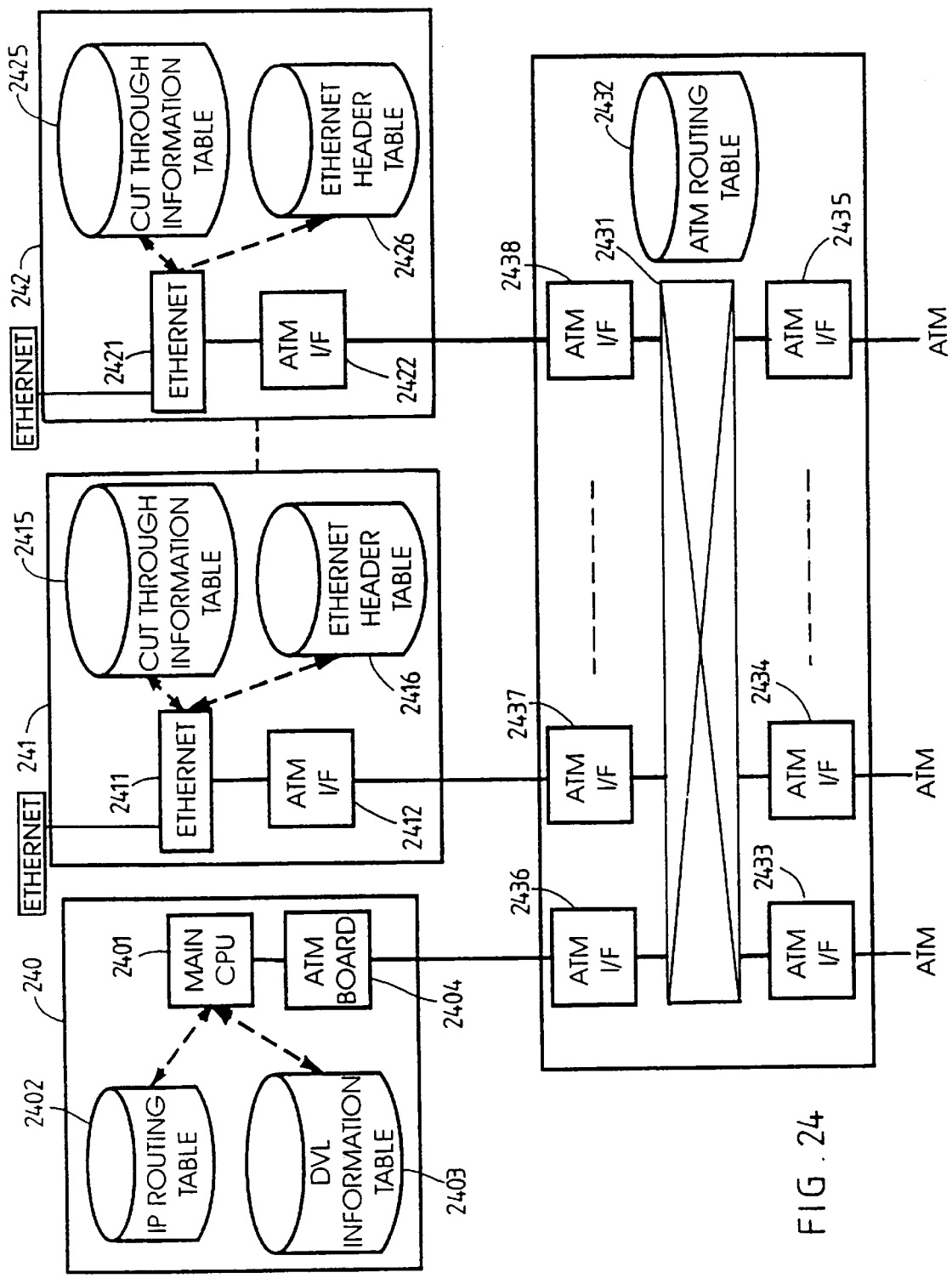
FIG. 24 shows yet another (fourth) exemplary configuration of a router according to the present invention.

FIG. 24 shows a fourth exemplary configuration of router 341, 342 or 343. In FIG. 24, a router accommodates a plurality of ATM interfaces and employs an ATM switch 243 in providing all the transfer routes between the interfaces. This configuration can achieve efficiently the transfer between Ethernet and Ethernet, between Ethernet and ATM, and between ATM and ATM in accordance with the principle of the present invention, i.e., conventional transfer using the IP header and cut-through transfer using a dedicated virtual link.

ATM switch 243 includes switch interfaces 2433~2438 and switching device 243. Switch interfaces 2433~2435 are connected with the ATM network, while switch interfaces 2436~2438 are connected with other modules within the router.

Main CPU 2401, similar to main-CPU 81 of FIG. 22, performs IP processing and processing relating to control of dedicated virtual links, e.g., exchange of control messages, management of storage units relating to the dedicated virtual links (IP routing table 2402 and dedicated virtual link information table 2403), etc.

ATM board 2404 provides a route whereby information processed by main CPU 2401 (ordinary datalink frames or IP packets, and control messages) is exchanged with the ATM network and Ethernet board.

Ethernet boards 241 and 242 accommodate a small number of (e.g., one) Ethernet interfaces, exchange frames with the Ethernets, and exchange packets with the ATM switch through ATM interfaces 2412 and 2422 respectively.

In this exemplary configuration, analysis of datalink frames received from an Ethernet is performed by hardware rather than the CPU. Analysis of the datalink frames is performed by referring to cut-through information table 2415 or 2425 to decide whether packet transfer by analysis of the IP header or cut-through transfer using dedicated virtual link information is to be performed.

A manner of transfer in a router of FIG. 24 will now be described.

First, a case when Ethernet interface 2421 has received a frame from an Ethernet is explained. Ethernet interface 2421 checks whether or not the received frame contains valid DVLI information, by reference to cut-through information table 2425.

If the received Ethernet frame is a conventional frame, i.e., contains no DVLI value (or there is no matching entry in cut-through information table 2425), ATM interface 2412 divides the frame into cells, and transfers the cells through ATM switch 243 to controller board 240. On controller board 240, ATM board 2404 assembles a packet from the cells and main CPU 2401 processes the packet.

Main CPU 2401 analyzes the packet information by referring to IP routing table 2402 and transfers the packet to an adequate output interface. At this time, if the packet belongs to a flow to which an output dedicated virtual link has been allocated, a pointer to the dedicated virtual link information table 2403 is obtained by referencing to IP routing table 2402, and the dedicated virtual link identification information (DVLI or VPI/VCI) to be attached is thereby obtained.

If a result of searching the IP routing table 2402 indicates that the output interface is Ethernet interface 2411, an adequate Ethernet header is attached (if a dedicated virtual link has been allocated on the output side, the header includes a DVLI; otherwise, it includes the ordinary source/destination MAC address). Then, ATM board 2404 converts the frame into cells, and the cells are transferred to ATM interface 2412 in Ethernet board 241 that accommodates Ethernet interface 2411.

VCs for internal transfer purposes are provided in advance between the ATM board and ATM interfaces 2412, 2422 of each Ethernet board 241, 242, so the cells are transferred with the VPI/VCI value determined thereon.

If a result of searching the IP routing table 2402 indicates that the output interface is ATM interface 2433, an adequate datalink header is attached (in the case of using the MAC layer processing, the header is an Ethernet header; otherwise, it is an LLC/SNAP header). Then, ATM board 2404 converts the frame or packet into cells, and transfers the cells to ATM interface 2433.

If there is a dedicated VC for this flow on the output side, a VPI/VCI corresponding to this dedicated VC, which is obtained from dedicated virtual link information table 2403, is attached on the transmission from ATM board 2404. If there is no dedicated VC for this flow on the output side, ATM board 2404 transmits the cells with a prescribed VPI/VCI corresponding to a default VC.

When cells are transferred from ATM board 2404 to output ATM interface 2433, the VPI/VCI value may be changed. That is, the VPI/VCI value attached by ATM board 2404 may be different from the VPI/VCI value when the cells are finally output from ATM interface 2433. However, since the correspondence relationship of these values is stored in ATM routing table 2432 shown in FIG. 25, the VPI/VCI value attached by ATM board 2404 can uniquely identify the corresponding output VC from the output interface whether the output VC is a dedicated VC or default VC.

If the received Ethernet frame includes a DVLI value, Ethernet interface 2421 refers to cut-through information table 2425 using the information of input interface 2421 and the input DVLI value, thereby obtaining the output interface and output datalink header information. If the output interface is Ethernet, the output datalink header is an Ethernet header. If the output interface is ATM, the output datalink header is a VPI/VCI value in the case where the packet is converted into cells with LLC/SNAP encapsulation and without MAC-layer processing, or is an Ethernet header in the case where the packet is converted into cells after going through MAC-layer processing.

Cut-through information table 2425 can teach a VPI/VCI value to be attached to a cell going to internal ATM switch 243 and Ethernet header information to be attached to a frame going to a next-hop node, based on the input DVLI.

If the cut-through information table 2425 shows that the output interface is Ethernet 2411, a VPI/VCI value of the VC for internal transfer from ATM interface 2422 to 2412 is attached, to transfer the cell from input Ethernet board 242 to output Ethernet board 241. If a dedicated virtual link to the next-hop node exists, the Ethernet header to be attached includes a DVLI; otherwise, it includes an ordinary source/destination MAC address.

When ATM interface 2412 receives cells from ATM switch 243, it reconstructs the frame and hands this over to Ethernet interface 2411 together with the received VPI/VCI value. Ethernet interface 2411 refers to Ethernet header table 2416 shown in FIG. 26 using the received VPI/VCI value as a key. If a corresponding entry is present, Ethernet interface 2411 sends the frame with the output Ethernet header given in this entry attached; otherwise, it sends the reconstructed frame as it is. In this case, the output Ethernet header is already attached by input Ethernet board 242, so the entry may not exist.

If the cut-through information table 2425 shows that the output interface is ATM 2433, a VPI/VCI value of the VC for transfer from input Ethernet board 242 to output ATM switch interface 2433 is attached. This VC may be either a VC corresponding to an output VC dedicated to the flow of the input DVLI, or a VC corresponding to a default output VC.

The default VC output from each ATM switch interface may carry a mixture of cells from all the input interface boards and from controller board 240. This means that a multipoint-point VC merged at ATM switch 243 is formed. It is therefore preferable to control transfer of cells such that interleaving of different frames does not occur.

Next, a case when ATM switch interface 2433 has received cells from an ATM network is explained. Switch interface 2433 refers to ATM routing table 2432 based on the VPI/VCI value of the received cell, to obtain an output ATM interface and an output VPI/VCI value. As shown in FIG. 25, ATM routing table 2432 stores the correspondence relationship between the input switch interface, input VPI/VCI and the output switch interface, output VPI/VCI for cell transfer by ATM switch.

If ATM routing table 2432 indicates that the output switch interface is switch interface 2436 connected to ATM board 2404, this means that the cells are to be processed by main CPU. Specifically, ATM board 2404 assembles a packet from the cells and sends the packet to main CPU 2401. The main CPU searches IP routing table 2402 (and dedicated virtual link information table 2403 if a dedicated virtual link is allocated on the output side) using the flow identifier as a key, and transfers the packet to the obtained output interface.

If a result of searching IP routing table 2402 is that the output interface is ATM (e.g., 2435), the packet is transferred to switch interface 2436 of ATM switch 243 via ATM board 2404 with the obtained VPIIVCI. Switch interface 2436 refers to ATM routing table 2432 based on the VPI/VCI value received, and thereby sends the received cells to output interface 2435 with an output VPI/VCI. If a VC dedicated to this flow has been allocated on the output side, the VPI/VCI corresponds to the dedicated VC; otherwise, the VPI/VCI corresponds to a default VC.

If a result of searching IP routing table 2402 is that the output interface is Ethernet (e.g., 2411), the packet is transferred, with a prescribed VPI/VCI attached, to switch interface 2436 of ATM switch 243 via ATM board 2404. Switch interface 2436 refers to-ATM routing table 2432 based on the VPI/VCI value received, and then sends the cells with another prescribed VPI/VCI toward output interface 2411 via switch interface 2437.

When ATM interface 2412 of Ethernet board 241 receives cells from ATM switch 243, it reconstructs the frame and hands it over to Ethernet interface 2411 together with the received VPI/VCI value. Ethernet interface 2411 refers to Ethernet header table 2416 shown in FIG. 26 using the received VPI/VCI value as a key. If a corresponding entry exists therein, Ethernet interface 2411 sends the frame with the output Ethernet header given in this entry attached.; otherwise, it sends the reconstructed frame as it is. In this case, the output Ethernet header can be already attached by controller board 240, and, if so, the entry may not exist. Anyway, if a dedicated virtual link has been allocated to the flow, the output Ethernet header includes a DVLI; if not, the output Ethernet header is of the ordinary format including source and destination MAC addresses.

If ATM routing table 2432 indicates that the output switch interface is an interface (e.g., 2437) connected to Ethernet board (e.g., 241), this means that at least the input VPI/VCI is dedicated to a specific flow. ATM interface 2412 of Ethernet board 241 connected to switch interface 2437 reconstructs the frame from the received cells, and hands it over to Ethernet interface 2411 together with the VPI/VCI value of the received cells.

Ethernet interface 2411 refers to Ethernet header table 2416 shown in FIG. 26 using the received VPI/VCI as a key. If a corresponding entry is found, Ethernet interface 2411 sends the frame with the output Ethernet header contained in this entry attached thereto. If a dedicated virtual link has been allocated to this flow, this Ethernet header includes a DVLI; if such a dedicated virtual link has not been allocated, this Ethernet header is of the ordinary format.

These Ethernet header table 2416 and 2426 are provided in order to attach an Ethernet header to an output frame in a case where an output Ethernet header has not been attached on reconstructing the frame from cells received from ATM switch 243.

Specifically, Ethernet boards 241 and 242 and controller board 240 can attach output Ethernet headers to frames received by Ethernet boards 241 and 242 and frames subjected to IP processing by controller board 240 respectively. However, ATM switch interfaces 2433~2435 transfers cells from ATM networks to an output Ethernet board only by performing VPI/VCI processing, so the cells arriving at the output Ethernet board do not contain output Ethernet headers. Accordingly, in order to acquire the output Ethernet header (which may include DVLI) on the basis of the received VPI/VCI value, these Ethernet header table 2416 and 2426 are referenced.

The contents of this Ethernet header table are partly the same as of the cut-through information table (FIG. 19). That is, the Ethernet header table can be created by excluding the information regarding the input/output interfaces from the cut-through information table. Thus, it is possible to make the cut-through information table serve also as Ethernet header table.

If ATM routing table 2432 indicates that the output switch interface is another interface (e.g., 2434) connected to an ATM network, this means that the output VPI/VCI is allocated in switch interface 2434 to the flow designated by the input VPI/VCI. In this case, the output interface and output VPI/VCI are obtained, and the cell is output from output interface 2434 simply by rewriting the VPI/VCI value as in an ordinary ATM switch. If, for some reason, a dedicated VPI/VCI for this flow is not allocated on the output side, the VPI/VCI of the default VC is obtained with the output switch interface.

As described above, in the fourth exemplary configuration, an ATM switch is used for transfer within the router of all packet/frame, e.g., packets subjected to IP processing, control messages, and frames transferred by cut-through on the basis of input dedicated virtual link identification information (DVLI or VPI/VCI). This can achieve the frame transfer with higher rate and higher throughput.

Consequently, the system according to the principle of the present invention can determine a next-hop node or output dedicated virtual link identification information to be attached to a Ethernet frame or ATM cell without analyzing a flow identifier of an individual packet (such as source IP address, destination IP address, and/or port number),by defining a dedicated virtual link (DVL or dedicated ATM-VC) for a specific flow in an Ethernet or ATM network and using input dedicated virtual link identification information contained in a received Ethernet frame or ATM cell header.

An exemplary control procedure between router and router or between host and router for implementing the transfer described above will now be described.

Figure 27:
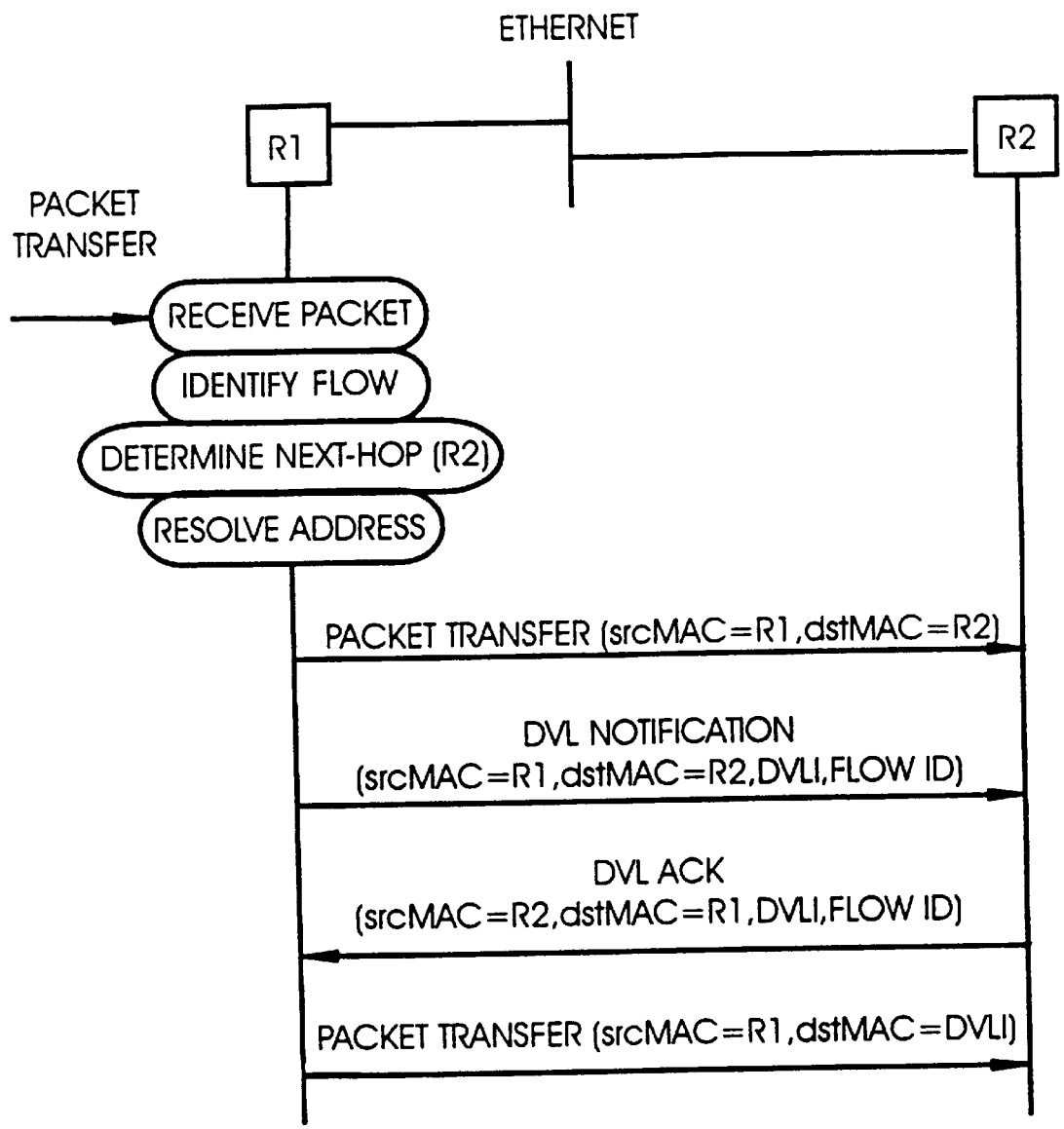
FIG. 27 shows an exemplary protocol sequence for cut-through between routers on both ends of an Ethernet.

FIG. 27 shows an example of control sequence between two routers R1 and R2 connected with an Ethernet.

When router R1 receives a datalink frame (to which dedicated virtual link information has not been attached) from an upstream node, it analyzes the flow identifier contained in the network-layer header and determines the next-hop node (R2) using the IP routing table. If necessary, R1 also acquires the MAC address of next-hop node R2 using address resolution protocol. Then, R1 transfers the Ethernet frame to R2.

In parallel with this ordinary packet transfer, R1 decides whether or not it is desirable to provide a dedicated virtual link in respect of this flow and, if it is decided desirable, starts the dedicated virtual link establishment procedure shown below.

First, R1 notifies R2 of the allocation of a dedicated virtual link (DVL) to a specific flow. The source IP/MAC address of this notification message is R1 and its destination IP/MAC address is R2. This notification message includes an identifier of the DVL and an identifier of the flow that is to occupy this DVLI.

When next-hop node R2 decides that the DVL written in the notification message is acceptable, it returns an ack message to R1. The source IP address of this ack message is R2 and its destination IP address is R1. The source MAC address of this ack message can be the MAC address of R2, but there is a case where it is desirable to enter the DVLI value into the source MAC address field. The destination MAC address can be R1. Here, an upstream node determines the DVLI value. However, alternatively, a downstream node R2 can determine a DVLI value and notify R1 of the value.

When R1 receives the ack message, it can transfer subsequent frames by writing the determined DVLI value into the source or destination MAC address field (in the example of FIG. 27, the destination MAC address field is used).

R1 or R2 can continue to send a message periodically in order to maintain the dedicated virtual link Alternatively, the dedicated virtual link can be maintained until R1 or R2 which decides that release of the DVL is desirable sends a release message.

In the above example, the DVL notification message is sent from R1 (upstream) to R2 (downstream), and the DVL ack message is sent from R2 (downstream) to R1 (upstream). However, alternatively or additionally, a downstream node which decides that it is desirable to provide a dedicated virtual link for a specific flow can send a notification message to the upstream node. Also, it is possible to dispense with sending of an ack message.

Figure 28:
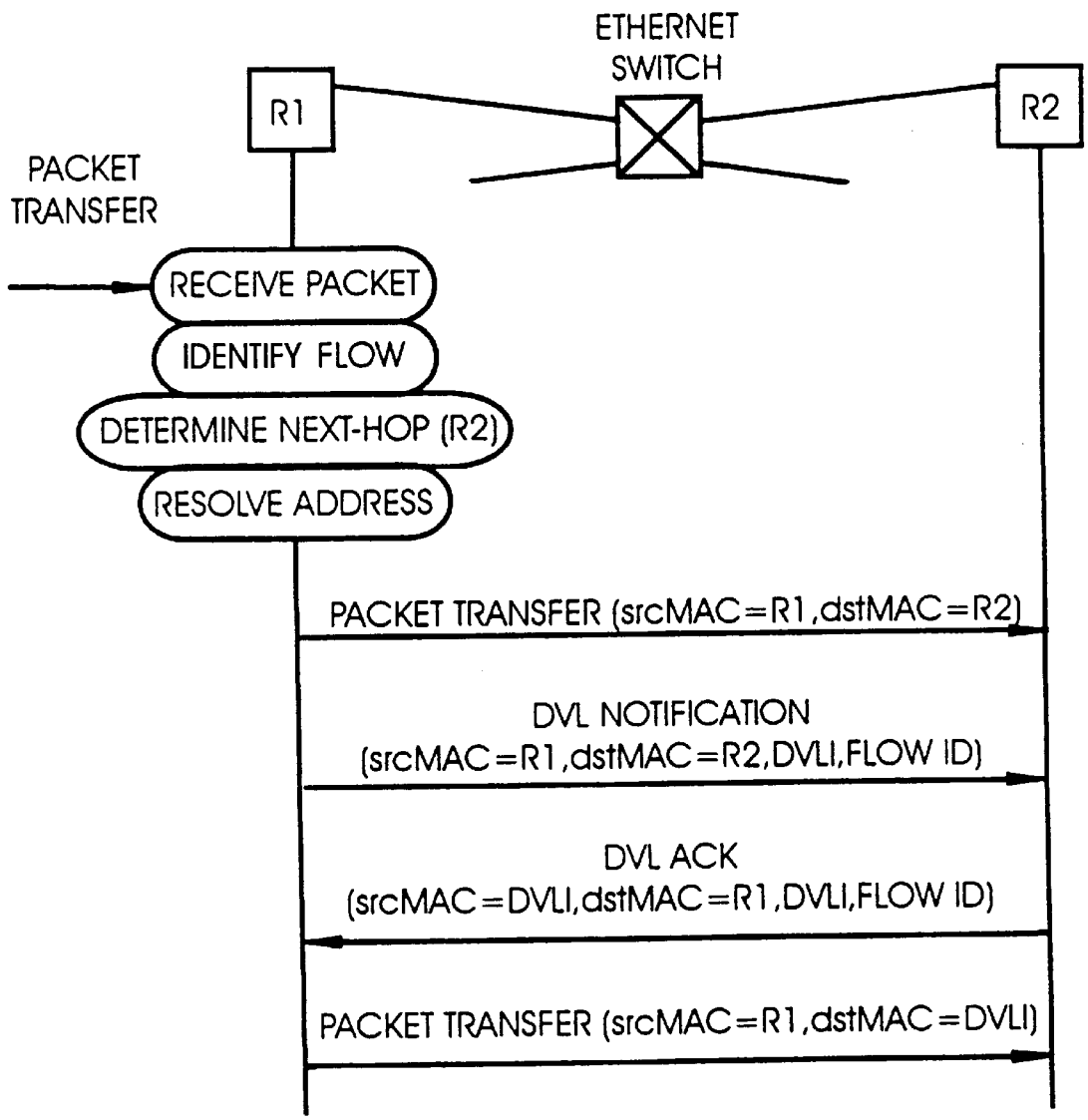
FIG. 28 shows an exemplary protocol sequence for cut-through between routers on both ends of an Ethernet switch network.

FIG. 28 shows an example of control sequence between two routers R1 and R2 connected with an Ethernet switch.

The basic procedure is similar to that shown in FIG. 27. However, in the case of Ethernet switch, if R1 sends an Ethernet frame with a newly determined DVLI entered into the destination MAC address field, it is required that an intermediate Ethernet switch switches the frame to R2 on the basis of the DVLI written in the destination MAC address field.

To practice this without adding a special function to the Ethernet switch, the Ethernet switch sets its switching function using the DVL ack message sent from R2 to R1. Specifically, while the destination MAC address of the DVL ack message is R1, the determined DVLI value is entered as its source MAC address.

The intermediate Ethernet switch on the transfer route uses its learning function. Specifically, the Ethernet switch examines the source MAC address field of a received frame, and recognizes that there exists a node having the MAC address written in the source MAC address field ahead of the interface whereby the frame was received. Then, the Ethernet switch stores the correspondence between the MAC address and the interface, and use this correspondence for transfer of subsequent frames. In this case, the Ethernet switch learns the correspondence between the DVLI and interface to be used for outputting a received frame having this DVLI in its destination MAC address field, i.e., interface connected to R2.

The learned MAC address information (including DVLI) may be aged after the lapse of a certain time. However, such aging can be prevented by having R2 periodically send a message for DVL maintenance to R1. The source MAC address field of this maintenance message is also the DVLI value. In other words, R2 continues sending a message the contents of which are the same as those of DVL ack message, as long as R2 desires to maintain the DVL.

In the case where the DVLI value is entered into the source MAC address field, since the destination MAC address field contains the MAC address of the node receiving the frame, the Ethernet switch can output the frame from the desired interface without entering the DVLI (instead, entering R2's own MAC address) into the source MAC address field of the DVL ack message.

The above control sequence can still be applied between two routers connected with an ATM network, in the case of using ATM network with MAC layer processing. In the case where there is no intervening MAC layer, i.e., the dedicated virtual link is identified by the VPI/VCI rather than the DVLI, R1 reserves a new dedicated VC when a dedicated virtual link is desired, and sends a DVL notification message including information identifying this dedicated VC and the flow identifier to R2.

In the example of control procedure described above, the upstream node has the initiative in setting up the dedicated virtual link. However, alternatively or additionally, the downstream node can have the initiative in exchanging a control message.

Though the above examples show a case where a received frame triggers the setup of the DVL, alternatively or additionally, a node can start the DVL setup when it recognizes that a new node exists ahead of a next-hop node or a previous-hop node. Also, though the above exemplary procedures is executed by link-by-link, alternatively or additionally, the procedure of the DVL setup can be executed between a starting node or an ingress node of the flow for which the DVL is to be allocated and an end node or an egress node of the flow, i.e., end-to-end.

Next, examples of how to determine a DVLI value will be described. In one method, one of the end nodes of a DVL (host or router) independently allocates a 46-bit value, i.e., 6-byte MAC address field excluding the I/G bit and U/L bit fields, as shown in FIG. 29(a). However, with this method, the same DVLI value might be allocated by different nodes belonging to the same logical network In another method, the node number defined by the vendor who manufactured the nodes is used as part of the DVLI value, as shown in FIG. 29(b). Specifically, one of the end nodes of a DVL that allocates a DVLI value sets its node identifier (lower 3 bytes of the universal address) in lower 3 bytes of the DVLI value and allocates independently the remaining 22 bits. Since the DVLI value includes the node identifier that is uniquely allocated to each node, the DVLI value allocated by a certain node does not compete with a DVLI value allocated by another node belonging to the same logical network, so long as all of the nodes connected to the logical network are due to one vendor. With this method, when each node manages allocation of the 22-bit value, a DVL can be identified by DVLI value uniquely within each logical network (e.g., IP subnet). It is also possible to determine a globally unique DVLI value.

FIG. 30 shows another exemplary network topology where the principle of the present invention can be applied. In FIG. 30, a device basically performing a layer-2 (MAC layer) processing such as Ethernet switch or bridge exists at a boundary of an Ethernet and an ATM network Explanation below takes a case where the devices 3006 and 3007 are Ethernet switches as an example, but these devices may be bridges.

Router 3001 and host 3004 which are connected with Ethernet switch 3006, and router 3002 connected with ATM network 3008 belong to one IP subnet 3010. Router 3003 and host 3005 which are connected with Ethernet switch 3007, and router 3002 connected with ATM network 3008 belong to another IP subnet 3011. Router 3001 further accommodates hosts via Ethernet 3012. Router 3003 further accommodates hosts via Ethernet 3013. Generally, a bridge or switch that is connected with a conventional LAN such as Ethernet and has an interface with an ATM network uses the LAN emulation technology specified by the ATM Forum on packet transfer over the ATM network.

For example, when router 3001 belonging to IP subnet 3010 transmits a packet to next-hop router 3002 belonging to the same IP subnet, router 3001 sends an Ethernet frame having the MAC address of next-hop router 3002 as destination MAC address to Ethernet switch 3006. Ethernet switch 3006 examines the destination MAC address of the received frame, transfers the frame to an output port having the ATM interface, converts the frame into cells, and then sends the cells through a VC to next-hop router 3002 in the ATM network To do this, the ATM interface of Ethernet switch 3005 stores the correspondence between the destination MAC address and the VC.

If a VC to router 3002 does not exist, a LAN emulation client in Ethernet switch 3006 sends a LANE-ARP (LAN Emulation Address Resolution Protocol) request message to a LAN emulation server (not shown in the figure) in the ATM network, and then obtains an ATM address corresponding to the MAC address of router 3002. Then, Ethernet switch 3006 sets up a VC to the obtained ATM address and sends the cells through the VC.

Router 3002 reconstructs the frame from the received cells and processes the Ethernet header including MAC addresses. Router 3002 can extract a packet from the frame and determine a next-hop node by examining the packet header including a destination IP address.

If the next-hop node is router 3003 belonging to IP subnet 3011, router 3002 constructs an Ethernet frame having the MAC address of next-hop router 3003 as destination MAC address. If router 3003 does not know the MAC address of router 3003, it performs ARP procedure to obtain a MAC address from an IP address. To send this frame to router 3003, router 3002 converts the frame into cells and sends the cells through a VC to Ethernet switch 3007. Specifically, a LAN emulation client in router 3002 sends a LANE-ARP request message regarding the MAC address of router 3002 to a LAN emulation server (not shown in the figure) in the ATM network, and then obtains an ATM address of Ethernet switch 3007 (egress of the ATM network for the frame) connected with router 3003. Then, router 3002 sets up a VC to the obtained ATM address and sends the cells through the VC.

Ethernet switch 3007 reconstructs a frame from the received cells, and sends the frame to router 3003 based on the destination MAC address.

As described above, using a method of transferring an Ethernet frame via an ATM network according to the LAN emulation scheme, the frame can be transferred from Ethernet switch 3006 to router 3002 through a VC, processed by IP with conversion between a frame and an IP packet in router 3002, and transferred from router 3002 to Ethernet switch 3007 through a VC.

Here, router 3002 can transfer a frame by checking and rewriting a DVU in the frame without IP processing, when a DVL is allocated between routers 3001 and 3002 and preferably also between routers 3002 and 3003 according to the principle of the present invention already described. It is preferable that the allocation of DVLI between routers does not affect the operations of intermediate Ethernet switches.

First, Ethernet switch 3006 transfers an Ethernet frame having a DVLI in the destination or source MAC address field as well as an ordinary Ethernet frame having the MAC address of router 3002 in the destination MAC field through a VC set up by the LAN emulation to router 3002. In the case where a DVLI is written in the source MAC address field, since the content of the destination MAC field is the same as in the ordinary frame, Ethernet switch 3006 switches the frame and selects a VC as ordinary. The selection of a VC can be done by referring to MAC address v. VC table 3101 in the Ethernet switch 3006. In this case, the contents of the MAC address v. VC table are, for example, the first line of FIG. 31 (the MAC address of router 3002 and VPI/VCI= 100/300).

On the other hand, in the case where a DVLI is written in the destination MAC address field, Ethernet switch 3006 creates a new entry in MAC address v. VC table 3101 as shown in the second or third line of FIG. 31 (DVLI1 allocated to a flow to router 3002 or DVLI2 allocated to another flow to router 3002 and VPI/VCI=100/300). This new entry make it possible for Ethernet switch 3006 to transfer a frame having the DVLI onto the same VC that is used for transferring an ordinary frame having the MAC address of router 3002. To create this new entry, for example, the two method described below can be adopted.

In one method, the downstream router 3002 sends a control message for DVU notification (e.g., DVL ack message) to the upstream router 3001, entering the DVLI value into the source MAC address field of the control message. This control message is transferred through the VC established by LAN emulation between router 3002 and Ethernet switch 3006. Ethernet switch 3006 learns a correspondence between the DVLI in the source MAC address field of the control message and the interface with ATM network 3008 whereby the control message was received, and also recognizes a correspondence between the DVLI and the VC through which the control message was received. Then, Ethernet switch 3006 sets its switching function of Ethernet to transfer a frame having the DVLI in the destination MAC address field received from router 3001 to the interface with ATM network 3008, and also creates a new entry in the MAC address v. VC table to transfer the frame onto the VC to router 3002.

In another method, Ethernet switch 3006 sets its switching function of Ethernet as the above-described method, but does not have a function to memorize the correspondence between the DVLI and the VC based on the control message. Ethernet switch 3006 receives a frame having the DVLI in the destination MAC address field after the control message exchange between routers 3001 and 3002 is finished. Then, Ethernet switch 3006 transfers the frame to the interface with ATM network 3008 by its switching function. When Ethernet switch 3006 does not found an entry for the destination MAC address field including the DVLI in the MAC address v. VC table of the ATM interface, a LAN emulation client for the ATM interface inquires of a LAN emulation server in IP subnet 3010 about an ATM address corresponding to the received MAC address including the DVLI.

If the LAN emulation server does not have information about the MAC address including the DVLI, it inquires of all of the LAN emulation clients in the IP subnet about this MAC address by broadcasting a frame. When a LAN emulation client in router 3002 receives this inquiry frame, it recognizes that the DVLI included in the MAC address in the inquiry is the one allocated between routers 3001 and 3002. Then, the LAN emulation client in router 3002 returns the ATM address of router 3002 to the LAN emulation server so that a frame with this MAC address including the DVLI is received by router 3002. The LAN emulation server that has received the reply notifies the LAN emulation client in Ethernet switch 3006 of the ATM address of router 3002. Alternatively, router 3002 can return the reply directly to Ethernet switch 3006.

The ATM interface of Ethernet switch 3006 obtains the ATM address corresponding to the MAC address including the DVLI in this way. Then, it checks the existence of a VC to the obtained ATM address and, if not, sets up a VC. Finally, Ethernet switch 3006 registers the correspondence between the VPI/VCI of the VC and the MAC address including the DVLI in the MAC address v. VC table.

Consequently, a frame with a DVLI can be transferred from Ethernet switch 3006 to router 3002 through a VC based on the LAN emulation. Router 3002 that receives the frame reconstructs the frame from received cells.

If a DVL has been allocated to the same packet flow between routers 3002 and 3003 by exchanging a control message including a DVLI value of the DVL, router 3002 can refer to the cut-through information table like FIG. 11 on the basis of the input DVLI written in the source or destination MAC address field of the frame received from Ethernet switch 3006 as cells, to output the frame as cells to next-hop router 3003 after rewriting the MAC address field without processing an IP packet.

In the case of using the source MAC address field to enter the DVLI, router 3002 refers to the cut-through information table based on the input DVLI written in the source MAC address field of the received frame, and enters the MAC address of router 3003 into the destination MAC address field and the output DVLI shared by routers 3002 and 3003 into the source MAC address field. Router 3002 has a MAC address v. VC table, the contents of which are similar to the first line of FIG. 31. Specifically, router 3002 registers a correspondence between the MAC address of router 3003 and the VC to Ethernet switch 3007 in this table in accordance with the LAN emulation procedure described above. Thus, router 3002 can determine an output VPI/VCI to be used in outputting the cells of the frame with the aforesaid destination MAC address.

In the case of using the destination MAC address field to enter the DVLI, router 3002 refers to the cut-through information table based on the input DVLI written in the destination MAC address field of the received frame, and enters the output DVLI shared by routers 3002 and 3003 into the destination MAC address field and the MAC address of router 3002 into the source MAC address field. Router 3002 has a MAC address v. VC table, the contents of which are similar to the first to third lines of FIG. 31. Specifically, router 3002 creates a new entry indicating a correspondence between the MAC address including the output DVLI value and the VC to Ethernet switch 3007 (the VC to be used for transmitting a frame toward router 3003) in this table. The LAN emulation client of router 3002 sends the cells of the frame including the output DVLI in its destination MAC address field through the VC to be used for transmitting a frame whose destination is the MAC address of router 3003, by referring to the new entry of the MAC address v. VC table.

Ethernet switch 3007 that has received the cells of the frame through the VC from router 3002 transfers the frame to an output interface to router 3003 when the destination MAC address field of the received frame includes the MAC address of router 3003. Also, Ethernet switch 3007 transfers the frame to an adequate interface when the destination MAC address field of the received frame includes the DVLI, by learning the correspondence based on a control message including the DVLI in its source MAC address field sent from router 3003 to router 3002.

In addition to those already mentioned above, persons of ordinary skill will realize that many modifications and variations of the above embodiments may be made without departing from the novel and advantageous features of the present invention.

Accordingly, all such modifications and variations are intended to be included within the scope of the appended claims.

The specification and examples are only exemplary. The following claims define the true scope and spirit of the invention.

What is claimed is:

1. A node, comprising:
  first means for transferring a connection-less type frame received from one logical network to another logical network by assembling a packet from the received frame and by referring to a destination network-layer address in the packet;
  a memory for storing a correspondence relationship between an input dedicated virtual link identifier allocated dedicatedly to a specified flow and information for designating a next-hop node to which a frame of the specified flow is to be transferred;
  second means for transferring a connection-less type frame received from one logical network to another logical network by referring to the correspondence relationship stored in the memory based on the input dedicated virtual link identifier written in the received frame using a Media Access Control (MAC) address field and by writing the information for designating the next-hop node in the frame to be transferred;

means for receiving a frame when the input dedicated virtual link identifier stored in the memory is written in the frame using a destination MAC address field, and wherein the second means includes means for referring to the correspondence relationship stored in the memory based on the input dedicated virtual link identifier written in the received frame using a destination MAC address field and writing the information designating the next-hop node in the frame to be transferred using the destination MAC address field;

means for creating a frame and writing the inout dedicated virtual link identifier in the created frame using a source MAC address field; and means for transmitting the created frame with the input dedicated virtual link identifier to said one logical network so that a datalink switch in said one logical network obtains information for routing a frame based on a destination MAC address in the frame the destination MAC address corresponding to the input dedicated virtual link identifier.

2. The node according to claim 1, wherein the means for receiving includes means for determining to receive the frame when the frame contains information indicating that the destination MAC address field is used for the input dedicated virtual link identifier.

3. The node according to claim 1, further comprising:

means for receiving a message inquiring about a MAC address;

means for responding to the message by sending an ATM address of the node when the inquired MAC address corresponds to the input dedicated virtual link identifier.

4. The node according to claim 1, wherein the second means includes means for determining to transfer the frame by the second means when the frame contains information indicating that the MAC address field is used for the input dedicated virtual link identifier.

5. The node according to claim 1, wherein said another logical network is a connection-oriented network; and wherein the memory includes a memory for storing a correspondence relationship between the information for designating the next-hop node and a virtual connection to be used for transferring a frame having the information for designating the next-hop node, and the second means includes means for transferring the frame having the information for designating the next-hop node onto the virtual connection.

6. The node according to claim 5, wherein the memory further includes a memory for storing an output dedicated virtual link identifier allocated dedicatedly to the specified flow as or in addition to the information for designating the next-hop node, and the second means further includes means for using a virtual connection dedicated to the specified flow to transfer the frame having the output dedicated virtual link identifier.

7. The node according to claim 5, wherein the second means further includes means for using a virtual connection to the next-hop node, the virtual connection shared by a plurality of flows, to transfer the frame having the information for designating the next-hop node.

8. The node according to claim 1, further comprising:

means for receiving/transmitting a message including information for identifying the specified flow and the input dedicated virtual link identifier allocated in said one logical network dedicatedly to the specified flow from/to said one logical network; and means for registering the input dedicated virtual link identifier included in the message into the memory.

9. The node according to claim 1, further comprising:

means for transmitting/receiving a message including information for identifying the specified flow and an output dedicated virtual link identifier allocated in said another logical network dedicatedly to the specified flow to/from said another logical network; and means for registering the output dedicated virtual link identifier included in the message into the memory as or in addition to the information for designating the next-hop node.

10. The node according to claim 1, further comprising:

a central control unit for referring to the destination network-layer address in the packet; and means for associating a first section for receiving the frame from one logical network, a second section for transmitting the frame to another logical network, and the memory, separately from the central control unit, and wherein the first means includes means for using the central control unit and the second means includes means for using the means for associating.

11. The node according to claim 1, further comprising:

a central control unit for referring to the destination network-layer address in the packet;

a bus for connecting a first section for receiving the frame from one logical network, a second section for transmitting the frame to another logical network, and the central control unit; and a switch for connecting the first section and the second section, and wherein the first means includes means for using the bus and the second means includes means for using the switch by referring to the memory.

12. The node according to claim 1, further comprising:

a central control unit for referring to the destination network-layer address in the packet; and a switch for connecting a first section for receiving the frame from one logical network, a second section for transmitting the frame to another logical network, and the central control unit, and wherein the first means includes means for using a virtual connection from the first section to the central control unit and a virtual connection from the central control unit to the second section via the switch, and the second means includes means for using the a virtual connection from the first section to the second section via the switch by referring to the memory.

13. A node, comprising:

first means for transferring a connection-less type frame received from one logical network to another logical network by assembling a packet from the received frame and by referring to a destination network-layer address in the packet;

a memory for storing a correspondence relationship between an input dedicated virtual link identifier allocated dedicatedly to a specified flow and information for designating a next-hop node to which a frame of the specified flow is to be transferred;

second means for transferring a connection-less type frame received from one logical network to another logical network by referring to the correspondence relationship stored in the memory based on the input dedicated virtual link identifier written in the received frame using a Media Access Control (MAC) address field and by writing the information for designating the next-hop node in the frame to be transferred;

means for receiving a frame when the input dedicated virtual link identifier stored in the memory is written in the frame using a destination MAC address fields and wherein the second means includes means for referring to the correspondence relationship stored in the memory based on the input dedicated virtual link identifier written in the received frame using a destination MAC address field and writing the information designating the next-hop node in the frame to be transferred using the destination MAC address field;

means for creating a frame and writing the input dedicated virtual link identifier in the created frame using a source MAC address field; and means for transmitting the created frame with the input dedicated virtual link identifier through a virtual connection to a datalink switch in said one logical network so that the data link switch obtains information for transferring a received frame onto the virtual connection based on a destination MAC address in the frame, the destination MAC address corresponding to the input dedicated virtual link identifier.

14. The node according to claim 13, wherein the means for receiving includes means for determining to receive the frame when the frame contains information indicating that the destination MAC address field is used for the input dedicated virtual link identifier.

15. The node according to claim 13, further comprising:

means for receiving a message inquiring about a MAC address;

means for responding to the message by sending an ATM address of the node when the inquired MAC address corresponds to the input dedicated virtual link identifier.

16. The node according to claim 13, wherein the second means includes means for determining to transfer the frame by the second means when the frame contains information indicating that the MAC address field is used for input dedicated virtual link identifier.

17. The node according to claim 13, wherein said another logical network is a connection-oriented network; and wherein the memory includes:

a memory for storing a correspondence relationship between the information for designating the next-hop node and a virtual connection to be used for transferring a frame having the information for designating the next-hop node, and the second means includes means for transferring the frame having the information for designating the next-hop node onto the virtual connection.

18. The node according to claim 17, wherein the memory further includes a memory for storing an output dedicated virtual link identifier allocated dedicatedly to the specified flow as or in addition to the information for designating the next-hop node, and the second means further includes means for using a virtual connection dedicated to the specified flow to transfer the frame having the output dedicated virtual link identifier.

19. The node according to claim 17, wherein the second means further includes means for using a virtual connection to the next-hop node, the virtual connection shared by a plurality of flows, to transfer the frame having the information for designating the next-hop node.

20. The node according to claim 13, further comprising:

means for receiving/transmitting a message including information for identifying the specified flow and the input dedicated virtual link identifier allocated in said one logical network dedicatedly to the specified flow from/to said one logical network; and means for registering the input dedicated virtual link identifier included in the message into the memory.

21. The node according to claim 13, further comprising:

means for transmitting/receiving a message including information for identifying the specified flow and an output dedicated virtual link identifier allocated in said another logical network dedicatedly to the specified flow to/from said another logical network; and means for registering the output dedicated virtual link identifier included in the message in to the memory as or in addition to the information for designating the next-hop node.

22. The node according to claim 13, further comprising:

a central control unit for referring to the destination network-layer address in the packet; and means for associating a first second for receiving the frame from one logical network, a second section for transmitting the frame to another logical network, and the memory, separately form the central control unit, and wherein the first means includes means for using the central control unit and the second means includes means for using the means for associating.

23. The node according to claim 13, further comprising:

a central control unit for referring to the destination network-layer address in the packet;

a bus for connecting a first section for receiving the frame from one logical network, a second section for transmitting the frame to another logical network, and the central control unit; and a switch for connecting the first section and the second section, and wherein the first means includes means for using the bus and the second means includes means for using the switch by referring to the memory.

24. The node according to claim 13, further comprising:

a central control unit for referring to the destination network-layer address in the packet; and a switch for connecting a first section for receiving the frame from one logical network, a second section for transmitting the frame to another logical network, and the central control unit, and wherein the first means includes means for using a virtual connection from the first section to the central control unit and a virtual connection from the central control unit to the second section via the switch, and the second means includes means for using the a virtual connection from the first section to the second section via the switch by referring to the memory.

25. A method of frame transfer, comprising the steps of:

storing a correspondence relationship between an input dedicated virtual link identifier allocated in one logical network dedicatedly to a specified flow and information for designating a next-hop node in another logical network to which a frame of the specified flow is to be transferred;

transferring a frame received from one logical network to another logical network by referring to the correspondence relationship stored in the memory based on the input dedicated virtual link identifier written in the received frame using a MAC address field and by writing the information for designating the next-hop node in the frame to be transferred; and transferring another frame received from one logical network to another logical network by assembling a packet from said another received frame and by referring to a destination network-layer address in the packet, when said another received frame does not contain the input dedicated virtual link identifier whose correspondence relationship is stored in the memory;

means for receiving a frame when the input dedicated virtual link identifier stored in the memory is written in the frame using a destination MAC address field, and wherein the second means includes means for referring to the correspondence relationship stored in the memory based on the input dedicated virtual link identifier written in the received frame using a destination MAC address field and writing the information designating the next-hop node in the frame to be transferred using the destination MAC address field;

means for creating a frame and writing the input dedicated virtual link identifier in the created frame using a source MAC address field; and means for transmitting the created frame with the input dedicated virtual link identifier lo said one logical network so that a datalink switch in said one logical network obtains information for routing a frame based on a destination MAC address in the frame, the destination MAC address corresponding to the input dedicated virtual link identifier.

26. A method of frame transfer, comprising the steps of:

storing a correspondence relationship between an input dedicated virtual link identifier allocated in one logical network dedicatedly to a specified flow and information for designating a next-hop node in another logical network to which a frame of the specified flow is to be transferred;

transferring a frame received from one logical network to another logical network by referring to the correspondence relationship stored in the memory based on the input dedicated virtual link identifier written in the received frame using a MAC address field and by writing the information for designating the next-hop node in the frame to be transferred; and transferring another frame received from one logical network to another logical network by assembling a packet from said another received frame and by referring to a destination network-layer address in the packet, when said another received frame does not contain the input dedicated virtual link identifier whose correspondence relationship is stored in the memory;

means for receiving a frame when the input dedicated virtual link identifier stored in the memory is written in the frame using a destination MAC address field, and wherein the second means includes means for referring to the correspondence relationship stored in the memory based on the input dedicated virtual link identifier written in the received frame using a destination MAC address field and writing the information designating the next-hop node in the frame to be transferred using the destination MAC address field;

means for creating a frame and writing the input dedicated virtual link identifier in the created frame using a source MAC address field; and means for transmitting the created frame with the input dedicated virtual link identifier through a virtual connection to a datalink switch in said one logical network so that the data link switch obtains information for transferring a received frame onto the virtual connection based on a destination MAC address in the frame, the destination MAC address corresponding to the input dedicated virtual link identifier.

\* \* \* \* \*

UNITED STATES PATENT AND TRADEMARK OFFICE
CERTIFICATE OF CORRECTION

PATENT NO. : 6,188,689 B1
DATED : February 13, 2001
INVENTOR(S) : Katsube et al.

It is certified that error appears in the above-identified patent and that said Letters Patent is hereby corrected as shown below:

Column 31, claim 1,
Line 15, change "inout" to -- input --.

Column 34, claim 13,
Line 19, change "fields" to -- field --.

Column 35, claim 25,
Line 48, change "lo" to -- to --.

Signed and Sealed this

Twelfth Day of March, 2002

Attest:

JAMES E. ROGAN
*Attesting Officer*   *Director of the United States Patent and Trademark Office*